US008141094B2

(12) United States Patent
Brown et al.

(10) Patent No.: US 8,141,094 B2
(45) Date of Patent: Mar. 20, 2012

(54) DISTRIBUTION OF RESOURCES FOR I/O VIRTUALIZED (IOV) ADAPTERS AND MANAGEMENT OF THE ADAPTERS THROUGH AN IOV MANAGEMENT PARTITION VIA USER SELECTION OF COMPATIBLE VIRTUAL FUNCTIONS

(75) Inventors: Aaron C. Brown, Austin, TX (US); Douglas M. Freimuth, New York, NY (US); Renato J. Recio, Austin, TX (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1111 days.

(21) Appl. No.: 11/949,419

(22) Filed: Dec. 3, 2007

(65) Prior Publication Data

US 2009/0144731 A1    Jun. 4, 2009

(51) Int. Cl.
*G06F 9/46* (2006.01)
*G06F 3/00* (2006.01)
*G06F 13/00* (2006.01)

(52) U.S. Cl. ............ 718/104; 710/2; 710/300; 710/303; 719/324

(58) Field of Classification Search ........................ None
See application file for complete search history.

(56) References Cited

U.S. PATENT DOCUMENTS

| | | | |
|---|---|---|---|
| 6,247,080 B1 | 6/2001 | Wallach et al. | |
| 6,842,857 B2 | 1/2005 | Lee et al. | |
| 7,530,071 B2 * | 5/2009 | Billau et al. | 718/104 |
| 7,613,847 B2 * | 11/2009 | Kjos et al. | 710/22 |
| 7,694,047 B1 * | 4/2010 | Alston | 710/62 |
| 2002/0152371 A1 | 10/2002 | Lee et al. | |
| 2003/0005068 A1 | 1/2003 | Nickel et al. | |
| 2003/0051021 A1 | 3/2003 | Hirschfeld et al. | |
| 2004/0003063 A1 | 1/2004 | Ashok et al. | |

(Continued)

OTHER PUBLICATIONS

Brown, Aaron C. et al., "Differentiating Blade Destination and Traffic Types in a Multi-Root PCIe Environment", U.S. Appl. No. 12/346,251, filed Dec. 30, 2008.

(Continued)

*Primary Examiner* — Jennifer To
*Assistant Examiner* — Bing Zhao
(74) *Attorney, Agent, or Firm* — Stephen J. Walder, Jr.; Matthew B. Talpis

(57) ABSTRACT

Mechanisms to address the situation where an input/output (I/O) fabric is shared by more than one logical partition (LPAR) and where each LPAR can share with the other LPARs an I/O adapter (LOA) are provided. In particular, each LPAR is assigned its own separate address space to access a virtual function (VF) assigned to it such that each LPAR's perception is that it has its own independent IOA. Each VF may be shared across multiple LPARs. Facilities are provided for management of the shared resources of the IOA via a Physical Function (PF) of the IOA by assignment of that PF to an I/O Virtualization Management Partition (IMP). The code running in the IMP acts as a virtual intermediary to the VFs for fully managing the VF error handling, VF reset, and configuration operations. The IMP also acts as an interface to the PF for accessing common VF functionality. Furthermore, the functions of resource assignment and management relative to the VFs and the client partitions that use those VFs, which might normally be done by an entity like a hypervisor, are implemented by this IMP.

18 Claims, 19 Drawing Sheets

U.S. PATENT DOCUMENTS

| | | | |
|---|---|---|---|
| 2004/0158834 | A1 | 8/2004 | Ham et al. |
| 2004/0181625 | A1 | 9/2004 | Armstrong et al. |
| 2004/0210678 | A1 | 10/2004 | Pettey et al. |
| 2005/0005062 | A1 | 1/2005 | Liu et al. |
| 2005/0034027 | A1 | 2/2005 | Hamilton et al. |
| 2005/0071363 | A1 | 3/2005 | Chen et al. |
| 2005/0071446 | A1 | 3/2005 | Graham et al. |
| 2005/0071514 | A1* | 3/2005 | Anderson et al. ............. 710/1 |
| 2005/0114555 | A1 | 5/2005 | Errickson et al. |
| 2005/0129040 | A1 | 6/2005 | Kiel et al. |
| 2005/0149651 | A1 | 7/2005 | Doak et al. |
| 2005/0182788 | A1 | 8/2005 | Arndt et al. |
| 2005/0198641 | A1 | 9/2005 | Eilam et al. |
| 2005/0240932 | A1 | 10/2005 | Billau et al. |
| 2005/0246453 | A1 | 11/2005 | Erlingsson et al. |
| 2005/0268047 | A1 | 12/2005 | Aslot et al. |
| 2005/0268052 | A1 | 12/2005 | Hepkin et al. |
| 2006/0085794 | A1 | 4/2006 | Yokoyama |
| 2006/0123111 | A1 | 6/2006 | Dea et al. |
| 2006/0174087 | A1 | 8/2006 | Hashimoto et al. |
| 2006/0195663 | A1 | 8/2006 | Arndt et al. |
| 2006/0218322 | A1 | 9/2006 | Hoese et al. |
| 2006/0218372 | A1 | 9/2006 | Ward |
| 2006/0221832 | A1 | 10/2006 | Muller et al. |
| 2006/0236063 | A1 | 10/2006 | Hausauer et al. |
| 2006/0239287 | A1 | 10/2006 | Johnsen et al. |
| 2006/0242330 | A1 | 10/2006 | Torudbakken et al. |
| 2006/0250945 | A1 | 11/2006 | Fernandes et al. |
| 2006/0281630 | A1 | 12/2006 | Bailey et al. |
| 2007/0011272 | A1 | 1/2007 | Bakke et al. |
| 2007/0061441 | A1* | 3/2007 | Landis et al. ............. 709/224 |
| 2007/0067366 | A1 | 3/2007 | Landis |
| 2007/0174850 | A1 | 7/2007 | Zur |
| 2007/0192466 | A1 | 8/2007 | Nahum |
| 2007/0192518 | A1 | 8/2007 | Rupanagunta et al. |
| 2007/0244937 | A1 | 10/2007 | Flynn, Jr. et al. |
| 2008/0091746 | A1 | 4/2008 | Hatasaki et al. |
| 2008/0133709 | A1 | 6/2008 | Aloni et al. |
| 2008/0155169 | A1 | 6/2008 | Hiltgen et al. |
| 2009/0006710 | A1 | 1/2009 | Daniel et al. |
| 2009/0113430 | A1 | 4/2009 | Riley |
| 2009/0119087 | A1 | 5/2009 | Ang et al. |
| 2009/0133016 | A1 | 5/2009 | Brown et al. |
| 2009/0133028 | A1 | 5/2009 | Brown et al. |
| 2009/0276773 | A1 | 11/2009 | Brown et al. |
| 2010/0146170 | A1 | 6/2010 | Brown et al. |
| 2010/0165874 | A1 | 7/2010 | Brown et al. |

OTHER PUBLICATIONS

Brown, Aaron et al., "Differentiating Traffic Types in a Multi-Root PCI Express Environment", U.S. Appl. No. 12/330,578, filed Dec. 9, 2008.
USPTO U.S. Appl. No. 11/940,357, 1 page.
USPTO U.S. Appl. No. 11/940,360, 2 pages.
USPTO U.S. Appl. No. 12/114,989, 2 pages.
USPTO U.S. Appl. No. 12/330,578, 1 page.
U.S. Appl. No. 12/114,989, filed May 5, 2008, Brown et al.
U.S. Appl. No. 11/940,360, filed Nov. 15, 2007, Brown et al.
U.S. Appl. No. 11/940,357, filed Nov. 15, 2007, Brown et al.
Office Action from China Patent Office dated Apr. 29, 2010 for Application No. 200810176301.4, 7 pages.
Final Office Action mailed Aug. 24, 2010 for U.S. Appl. No. 12/114,989; 34 pages.
Office Action mailed Aug. 16, 2010 for U.S. Appl. No. 12/346,251; 27 pages.
Response to Office Action filed with the USPTO on Nov. 5, 2010 for U.S. Appl. No. 12/346,251, 17 pages.
USPTO U.S. Appl. No. 12/346,251, 1 page.
Final Office Action mailed Jan. 5, 2011 for U.S. Appl. No. 12/346,251; 21 pages.
Office Action mailed Jan. 3, 2011 for U.S. Appl. No. 12/114,989; 26 pages.
Preliminary Amendment filed with the USPTO on Nov. 17, 2010 for U.S. Appl. No. 12/114,989, 33 pages.
Interview Summary dated Aug. 26, 2011 for U.S. Appl. No. 11/940,357, 16 pages.
Notice of Allowance mailed on Sep. 15, 2011 for U.S. Appl. No. 12/346,251, 16 pages.
Office Action mailed Jul. 15, 2010 for U.S. Appl. No. 12/114,989, 26 pages.
Response to Office Action filed with the USPTO on Aug. 25, 2011 for U.S. Appl. No. 11/940,357, 36 pages.
Response to Office Action filed with the USPTO on Aug. 31, 2011 for U.S. Appl. No. 11/940,360, 36 pages.
Appeal Brief filed with the USPTO on May 18, 2011 for U.S. Appl. No. 12/346,251, 29 pages.
Interview Summary mailed Apr. 18, 2011 for U.S. Appl. No. 12/114,989; 3 pages.
Office Action mailed May 25, 2011 for U.S. Appl. No. 11/940,357; 53 pages.
Office Action mailed Jun. 2, 2011 for U.S. Appl. No. 11/940,360; 50 pages.
Response to Office Action filed with the USPTO on Apr. 4, 2011 for U.S. Appl. No. 12/114,989, 37 pages.
Interview Summary mailed Oct. 28, 2011 for U.S. Appl. No. 12/114,989, 3 pages.
Notice of Allowance mailed on Nov. 23, 2011 for U.S. Appl. No. 11/940,357; 11 pages.
Notice of Allowance mailed on Nov. 28, 2011 for U.S. Appl. No. 11/940,360; 12 pages.
Response to Office Action filed with the USPTO on Oct. 14, 2011 for U.S. Appl. No. 12/114,989, 12 pages.

* cited by examiner

*FIG. 8A*

| EVENT IN CRQ | CLIENT RESPONSE | IMP RESPONSE |
|---|---|---|
| 802 PARTNER PARTITION CONNECTED | CHANGE STATE TO CONNECTED FOR IMP. FOR INITIAL CONNECTIONS, CLIENT MAY LOAD DEVICE DRIVER TO TALK TO IMP AND POTENTIALLY TO OBTAIN VF RESOURCES. | CHANGE STATE TO CONNECTED FOR CLIENT. FOR INITIAL CONNECTION, COMMUNICATE AVAILABLE RESOURCES TO CLIENT. |
| 804 PARTNER PARTITION FAILED | CHANGE STATE TO NOT CONNECTED FOR IMP. CONTINUE USE OF VF UNTIL WHICH TIME CRQ LINKAGE IS NEEDED, AND IF NOT CONNECTED AT THAT TIME (THAT IS, PARTNER PARTITION CONNECTED NOT RECEIVED IN THE MEAN TIME), THEN ENTER ERROR RECOVERY | CHANGE STATE TO NOT CONNECTED FOR CLIENT. |
| 806 PARTNER PARTITION TERMINATED CONNECTION | TERMINATE VF USAGE AND POST AN ERROR | REQUEST HYPERVISOR TO RESCIND RESOURCES ALLOCATED TO CLIENT |

*FIG. 8C*

| IMP REQUEST | CLIENT RESPONSE |
|---|---|
| 852 ANY INVALID REQUEST FOR VF | ON ANY INVALID REQUEST, RETURN AN ERROR RESPONSE |
| 854 RESOURCE AVAILABLE | RECEIVE RESOURCE "TOKEN", SAVE IT FOR FUTURE USE, USE IT WITH HYPERVISOR CALL TO RECEIVE RESOURCES, MAP RESOURCES INTO CLIENT PARTITION'S SPACE, QUERIES VF CONFIGURATION SPACE, LOADS VF DEVICE DRIVER |
| 856 RETURN RESOURCE | CLIENT STOPS USING VF, REQUESTS RESET OF VF THROUGH CRQ, REMOVES DEVICE DRIVER FOR VF, REMOVES VF FROM OS'S FABRIC CONFIGURATION, CALLS FIRMWARE TO REMOVE VF FROM LPAR |

810

| CLIENT REQUEST | IMP RESPONSE |
|---|---|
| 812 — ANY INVALID REQUEST FOR VF | ON ANY INVALID REQUEST, RETURN AN ERROR RESPONSE |
| 814 — CONFIGURATION READ | RETURN REQUESTED DATA FROM VF's OR PF's CONFIGURATION SPACE OR RETURN ERROR RESPONSE |
| 816 — CONFIGURATION WRITE | WRITE REQUESTED DATA TO VF's CONFIGURATION SPACE, RETURN SUCCESS OR ERROR RESPONSE |
| 818 — RESET VF | ISSUE FUNCTION LEVEL RESET (FLR) TO VF, RETURN SUCCESS OR ERROR RESPONSE |
| 820 — QUERY ERROR STATE FOR VF | RETURN ERROR STATE, OR RETURN ERROR RESPONSE |
| 822 — ENABLE LOAD/STORE TO VF | REMOVE VF FROM MMIO ERROR STATE, RETURN SUCCESS OR ERROR RESPONSE |
| 824 — GET I/O FABRIC ERROR INFORMATION | GATHER FABRIC ERROR REGISTERS AND RETURN DATA, OR RETURN ERROR RESPONSE |
| 826 — VF OPERATIONS TERMINATED DUE TO DYNAMIC REMOVE | IMP ACKNOWLEDGES REQUEST, REQUESTS HYPERVISOR TO RESCIND RESOURCES ALLOCATED TO CLIENT, AND STOPS USING CRQ |
| 828 — VF DRIVER TO PF DRIVER COMMUNICATIONS | IMP PASSES REQUEST TO PF DEVICE DRIVER, GETS RESPONSE BACK FROM PF DRIVER, RETURNS RESPONSE TO CLIENT FOR PASSING ON TO VF DRIVER, OR RETURNS ERROR RESPONSE |

*FIG. 8B*

| | CALL | USED BY CLIENT LPAR FOR VFs? | USED BY IMP LPAR? |
|---|---|---|---|
| 902 | ADD COMMAND (REQUEST) OR RESPONSE TO CRQ OF PARTNER LPAR | YES | YES |
| 904 | GET COMMAND (REQUEST) OR RESPONSE FROM CRQ | YES | YES |
| 906 | READ/WRITE I/O CONFIGURATION SPACE | NO | YES |
| 908 | RESET PF (AND ALL VFs ASSOCIATED WITH PF) | NO | YES |
| 910 | DISABLE VF | NO | YES |
| 912 | QUERY PF AND VF ERROR STATE | NO | YES |
| 914 | ENABLE PF AND VF FOR LOAD AND STORE OPERATIONS | NO | YES |
| 916 | QUERY I/O FABRIC ERROR INFORMATION | NO | YES |
| 918 | QUERY INTERRUPT SOURCE | YES | YES |
| 920 | SETUP DMA TRANSLATION | YES | YES |
| 922 | ADD/REMOVE ADAPTER FROM LPAR USE | NO | NO |
| 924 | GRANT LOGICAL RESOURCE | NO | YES |
| 926 | ACCEPT LOGICAL RESOURCE | YES | YES |
| 928 | RETURN LOGICAL RESOURCE | YES | NO |
| 930 | RESCIND LOGICAL RESOURCE (NORMAL) | NO | YES |
| 932 | RESCIND LOGICAL RESOURCE (FORCED) | NO | YES |

| HMC REQUEST | TARGET OF REQUEST | RESPONSE | |
|---|---|---|---|
| QUERY I/O FABRIC CONFIGURATION (HYPERVISOR) | HYPERVISOR | HYPERVISOR RETURNS INFORMATION ABOUT I/O THAT EXISTS AND CHARACTERISTICS OF THAT I/O (FOR EXAMPLE, NUMBER AND TYPE OF ADAPTERS) | 1002 |
| QUERY I/O FABRIC CONFIGURATION (IMP) | IMP | IMP RETURNS INFORMATION ABOUT IOV ADAPTERS ASSIGNED TO IT (FOR EXAMPLE, NUMBER OF PF AND ASSOCIATED VFs) | 1004 |
| SET LPAR I/O CONFIGURATION | HYPERVISOR | HYPERVISOR ASSIGNS IOV ADAPTERS TO IMP LPARs, AS DIRECTED, AND PASSES THAT INFORMATION TO EACH IMP PRIOR TO BOOTING THE OS FOR THAT LPAR, ALSO TO SETUP CRQ LINKAGES | 1006 |
| SET INITIAL VF TO CLIENT PARTITION ASSIGNMENTS | IMP | IMP TURNS ON IOV FOR PF(s), ESTABLISHES COMMUNICATIONS WITH CLIENT PARTITIONS, SHARES APPROPRIATE VF-RELATED RESOURCES WITH CLIENTS | 1008 |
| POWER UP/DOWN IOA | HYPERVISOR OR IMP | HYPERVISOR OR IMP TURNS ON OR OFF POWER TO AN ADAPTER, AS DIRECTED | 1010 |
| DYNAMIC ASSIGNMENT OF AN IOV ADAPTER | HYPERVISOR | HYPERVISOR SETS UP RESOURCES (FOR EXAMPLE, ADDRESS SPACE AND INTERRUPTS) FOR RECEIVING IMP | 1012 |
| DYNAMIC ADD OF AN IOV ADAPTER TO AN IMP | IMP | IMP CALLS FIRMWARE TO ADD ADAPTER TO LPAR, ADDS ADAPTER TO FABRIC CONFIGURATION, INITIALIZES PF CONFIG SPACE, | 1014 |
| DYNAMIC ADD/REMOVE OF A VF | IMP OR CLIENT | ADD A NEW VF OF AN EXISTING PF INTO USE OR REMOVE AN EXISTING VF LINKAGE. INCLUDES CREATING/BREAKING CRQ LINKAGE, COMMUNICATING WITH THE CLIENT TO ADD/REMOVE RESOURCES. | 1016 |
| DYNAMIC REMOVE OF AN IOV ADAPTER (HYPERVISOR) | HYPERVISOR | HYPERVISOR REMOVES THE RESOURCES FROM THE IMP FOR THE IOV ADAPTER (FOR EXAMPLE, ADDRESS SPACE, INTERRUPTS) | 1018 |
| DYNAMIC REMOVE OF AN IOV ADAPTER (IMP) | IMP | IMP STOPS USING PF, RESETS PF, REMOVES DEVICE DRIVER FOR PF, REMOVES PF FROM OS's FABRIC CONFIGURATION | 1020 |
| IOA SOUTH SIDE MANAGEMENT | IMP | IMP PASSES REQUEST TO PF DEVICE DRIVER TO CONTROL THE SOUTH SIDE MANAGEMENT FUNCTIONS OF THE IOA (e.g., SETTING A VF's NETWORK ADDRESS) | 1022 |
| QUERY PREVIOUS COMMAND COMPLETION AND STATUS | ANY | FOR A POLLED TYPE HMC INTERFACE, TARGET RETURNS ANY DATA FROM THE PREVIOUS COMMAND AND THE STATUS OF THE COMPLETION | 1024 |

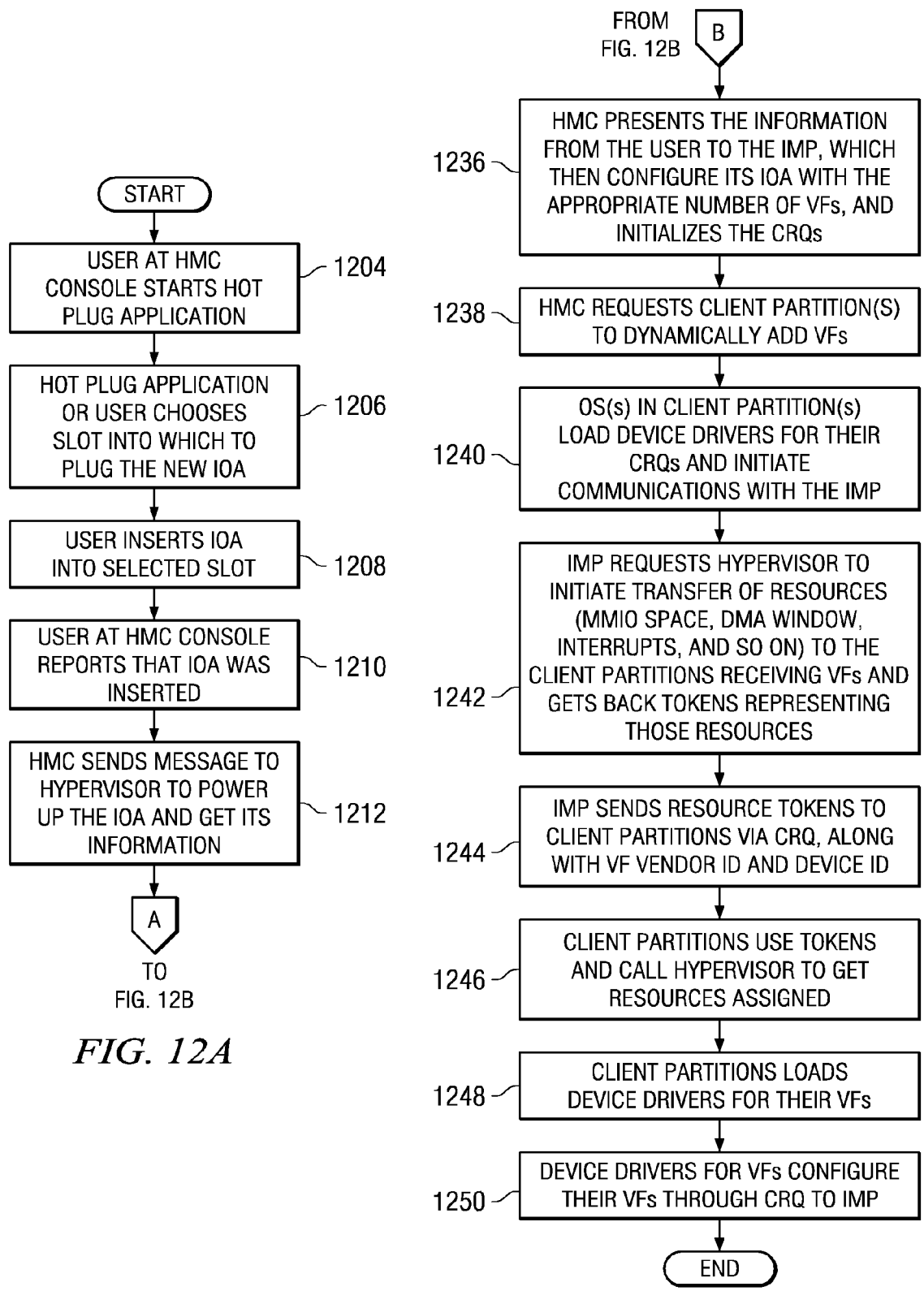

DISTRIBUTION OF RESOURCES FOR I/O VIRTUALIZED (IOV) ADAPTERS AND MANAGEMENT OF THE ADAPTERS THROUGH AN IOV MANAGEMENT PARTITION VIA USER SELECTION OF COMPATIBLE VIRTUAL FUNCTIONS

BACKGROUND

1. Technical Field

The present invention relates generally to an improved data processing system and method. More specifically, the present invention is directed to a system and method for management of an input/output virtualization (IOV) adapter, such as a Peripheral Component Interconnect (PCI) IOV adapter, through a virtual intermediary in an IOV management partition.

2. Description of Related Art

Most modern computing devices make use of input/output (I/O) adapters and buses that utilize some version or implementation of the Peripheral Component Interconnect standard, which was originally created by Intel in the 1990s. The Peripheral Component Interconnect (PCI) standard specifies a computer bus for attaching peripheral devices to a computer motherboard. PCI Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links, which are connected to exactly two devices.

FIG. 1 is an exemplary diagram illustrating a system incorporating a PCI Express (PCIe) fabric topology in accordance with the PCIe specification. As shown in FIG. 1, the system 100 is comprised of a host processor (CPU) 110 and memory 120 coupled to a root complex 130, which is in turn coupled to one or more of a PCIe endpoint 140 (the term "endpoint" is used in the PCIe specification to refer to PCIe enabled I/O adapters), a PCI express to PCI bridge 150, and one or more interconnect switches 160. The root complex 130 denotes the root of an I/O hierarchy that connects the CPU/memory to the I/O adapters. The root complex 130 includes a host bridge, zero or more root complex integrated endpoints, zero or more root complex event collectors, and one or more root ports. Each root port supports a separate I/O hierarchy. The I/O hierarchies may be comprised of a root complex 130, zero or more interconnect switches 160 and/or bridges 150 (which comprise a switch or PCIe fabric), and one or more endpoints, such as endpoints 140, 170 and 182-188. For more information regarding PCI and PCIe, reference is made to the PCI and PCIe specifications available from the peripheral component interconnect special interest group (PCI-SIG) website.

In addition to the PCI and PCIe specifications, the PCI-SIG has also defined input/output virtualization (IOV) standards for defining how to design an I/O adapter (IOA) which can be shared by several logical partitions (LPARs). A LPAR is a division of a computer's processors, memory, and storage into multiple sets of resources so that each set of resources can be operated independently with its own operating system instance and applications. The number of logical partitions that can be created depends on the system's processor model and resources available. Typically, partitions are used for different purposes such as database operation, client/server operation, to separate test and production environments, or the like. Each partition can communicate with the other partitions as if the other partition is in a separate machine. In modern systems that support LPARs, some resources may be shared amongst the LPARs. As mentioned above, in the PCI and PCIe specification, one such resource that may be shared is the I/O adapter using I/O virtualization mechanisms.

While the PCI-SIG provides a standard for defining how to design an IOA which can be shared by several LPARs, this specification does not define how to connect the IOA into a host system. Moreover, the standard does not specify how to manage the shared functionality of an IOA utilizing I/O virtualization. This is because the PCI-SIG specification is concerned with setting standards for the operation of the PCIe fabric below the root complex. In other words, the PCI-SIG does not provide any definition of standards for the root complex and above because that is considered the domain of system houses. That is, each of an Intel platform, an IBM Power® platform, and a Sparc platform, for example, may have different system implementation requirements that are not set forth in the PCI-SIG standards.

SUMMARY

The illustrative embodiments provide a system and method for management of an input/output virtualization (IOV) adapter through a virtual intermediary in an IOV management partition. The mechanisms of the illustrative embodiments address the situation where an input/output (I/O) fabric is shared by more than one logical partition (LPAR) and where each LPAR can potentially share with the other LPARs an I/O adapter (IOA).

In particular, with the mechanisms of the illustrative embodiments, each LPAR is assigned its own separate address space to access a virtual function (VF) assigned to it, and to receive interrupts directly from the VF assigned to it, such that each LPAR's perception is that it has its own independent IOA for purposes of normal I/O operations. Each VF of an IOA, such as a PCI Express (PCIe) I/O Virtual (IOV) adapter, may be shared across multiple LPARs. The mechanisms of the illustrative embodiments provide facilities for management of the shared resources of the IOV adapter via a Physical Function (PF) of the IOV adapter by assignment of the entire IOV adapter to an I/O Virtualization Management Partition (IMP). More specifically, the code running in the IMP acts as a virtual intermediary (VI) to the VFs for purposes of fully managing the VF error handling, VF reset, and configuration operations. In addition, the IMP acts as the interface to the PF for purposes of accessing common VF functionality (for example, the network addresses for the VFs for a network adapter), which will be referred to here as the adapter south-side management.

Furthermore, the functions of resource assignment and management relative to the VFs and the client partitions that use those VFs, which might normally be done by a virtualization platform, such as a hypervisor, are implemented by this IMP. Resource assignment here means the assignment of facilities like Memory Mapped I/O (MMIO) address space, DMA address space, interrupts, and so on, that were initially assigned as a pool of resources to the IMP along with the VFs of an adapter, to client partitions in the system.

In one illustrative embodiment, a method for managing input/output (I/O) virtualization is provided. The method may comprise creating one or more client partitions in the data processing system, each client partition having an associated portion of resources of the data processing system, and creating, in the data processing system, an I/O virtualization management partition (IMP). The method may further comprise identifying, by the IMP, one or more I/O virtualization (IOV) enabled I/O endpoints associated with the data processing system, assigning, by the IMP, virtual functions of the one or more IOV enabled I/O endpoints to the one or more client partitions, and creating, by a hypervisor of the data processing system, at least one communication structure for communicating between the IMP and the one or more client partitions based on the assignment of virtual functions to the one or more client partitions. The method may further comprise performing, by at least one client partition of the one or more client partitions, virtual function configuration operations with one or more virtual functions of the one or more IOV enabled I/O endpoints using the at least one communication structure.

The method may further comprise assigning, by the hypervisor of the data processing system, a portion of resources of the data processing system to the IMP for management by the IMP and determining, by the IMP, a number of resources necessary for the virtual functions assigned to the one or more client partitions. Moreover, the method may comprise determining a number of virtual functions to be implemented in the data processing system and to which client partitions of the one or more client partitions to assign each virtual function, and performing one or more calls from the one or more client partitions, to which virtual functions are assigned, to the hypervisor to assign resources from the portion of resources to the one or more client partitions.

Determining a number of virtual functions to be implemented in the data processing system and to which client partitions of the one or more client partitions to assign each virtual function may comprise determining a number of virtual functions supported by each identified IOV enabled I/O endpoint, and presenting information describing the identified IOV enabled I/O endpoints and the number of virtual functions supported by each identified IOV enabled I/O endpoint to a user. Determining a number of virtual functions to be implemented in the data processing system and to which client partitions of the one or more client partitions to assign each virtual function may further comprise receiving user input indicating a number of virtual functions to be implemented in the data processing system and to which client partitions of the one or more client partitions to assign each virtual function.

The method may further comprise requesting, by the IMP, that the hypervisor initiate a transfer of resources to the one or more client partitions to which virtual functions are assigned, receiving, in the IMP, from the hypervisor, in response to the request, one or more tokens, and sending, from the IMP, the tokens to the one or more client partitions via the communication structure. The one or more client partitions may use the one or more tokens to obtain resources from the hypervisor.

The IMP may be provided with access to only configuration spaces for physical functions assigned to the IMP and configuration spaces for virtual functions belonging to physical functions assigned to the IMP, in the one or more IOV enabled I/O endpoints. The one or more client partitions may not have direct access to configuration spaces of virtual functions assigned to the one or more client partitions, in the one or more IOV enabled I/O endpoints, and may only access the configuration spaces of virtual functions assigned to the one or more client partitions via the IMP using the at least one communication structure. The IMP may permit access by a client partition to configuration spaces of virtual functions, in the one or more IOV enabled I/O endpoints, assigned to the client partition and blocks access by the client partition to configuration spaces of virtual functions, in the one or more IOV enabled I/O endpoints, that are not assigned to the client partition.

The method may further comprise receiving an input from a hardware management console (HMC) directing assignment of the virtual functions to the one or more client partitions and directing performance of the I/O virtualization management operations. The input from the HMC may be a command to initiate a hot-plug operation for adding a new IOV enabled I/O endpoint to the data processing system. In such a case, performing the I/O virtualization management operations may comprise assigning the new IOV enabled I/O endpoint to the IMP, configuring the IMP based on the addition of the new IOV enabled I/O endpoint, and dynamically adding at least one virtual function of the new IOV enabled I/O endpoint to at least one client partition in the one or more client partitions. Performing the I/O virtualization management operations may further comprise allocating resources to the at least one client partition in the one or more client partitions based on the dynamic adding of the at least one virtual function of the new IOV enabled I/O endpoint and configuring the at least one virtual function of the new IOV enabled I/O endpoint via the IMP using the at least one communication structure.

The input from the HMC may be a command to initiate a hot-plug operation for removing an existing IOV enabled I/O endpoint from the data processing system. In such a case, performing the I/O virtualization management operations may comprise identifying at least one client partition in the one or more client partitions having resources associated with a virtual function of the IOV enabled I/O endpoint to be removed, removing the virtual function and resources associated with the virtual function from use by the at least one client partition, removing, from use by the IMP, a physical function and resources associated with the physical function, and powering down the IOV enabled I/O endpoint to be removed.

The input from the HMC may be a command to dynamically reconfigure the data processing system. In such a case, performing the I/O virtualization management operations may comprise receiving a selection of a virtual function of an IOV enabled I/O endpoint to add to a selected client partition in the one or more client partitions, creating at least one communication structure for the selected virtual function in the IMP and the selected client partition, and sending a request, from the IMP to the hypervisor, requesting a transfer of resources to the selected client partition. Performing the I/O virtualization management operations may further comprise receiving, in the IMP, at least one token from the hypervisor in response to the request, providing the at least one token to the selected client partition; setting up resources for selected virtual function in the selected client partition, using the at least one token, by the selected client partition, to obtain resources from the hypervisor, and loading a device driver for the selected virtual function in the selected client partition.

The input from the HMC may be a command to dynamically reconfigure the data processing system In such a case, performing the I/O virtualization management operations may comprise receiving a selection of a virtual function of an I/O endpoint to remove from a selected client partition in the one or more client partitions, removing the selected virtual function from further use by the selected client partition, and removing resources for selected virtual function in the selected client partition.

In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

In one illustrative embodiment, a data processing system is provided that may comprise one or more client partitions, each client partition having an associated portion of resources of the data processing system, an I/O virtualization management partition (IMP) in communication with the one or more client partitions, one or more I/O endpoints in communication with the IMP, and at least one communication structure provided in association with the IMP and the one or more client partitions. The IMP may identify one or more I/O virtualization (IOV) enabled I/O endpoints associated with the data processing system. Moreover, the IMP may assign virtual functions of the one or more IOV enabled I/O endpoints to the one or more client partitions. Furthermore, at least one client partition of the one or more client partitions may perform virtual function configuration operations with one or more virtual functions of the one or more IOV enabled I/O endpoints using the at least one communication structure.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 8A is an exemplary diagram illustrating a definition of a set of exemplary CRQ hypervisor events in accordance with one illustrative embodiment;

FIG. 8B is an exemplary diagram illustrating a definition of a set of CRQ client requests along with the expected corresponding responses in accordance with one illustrative embodiment;

FIG. 8C is an exemplary diagram illustrating a definition of a set of CRQ IMP requests along with the expected corresponding responses in accordance with one illustrative embodiment;

FIG. 9 is an exemplary diagram illustrating a definition of a set of exemplary Logical Partition (LPAR) to platform firmware calls in accordance with one illustrative embodiment;

FIG. 10 is an exemplary diagram illustrating a definition of a set of exemplary Hardware Management Console (HMC) to platform requests and responses in accordance with one illustrative embodiment;

FIGS. 12A-12C are a flowchart outlining an exemplary hot-plug operation for adding an IOV adapter to a system in accordance with one illustrative embodiment;

DETAILED DESCRIPTION OF THE ILLUSTRATIVE EMBODIMENTS

The illustrative embodiments provide mechanisms for management of an input/output virtualization (IOV) adapter through a virtual intermediary and resource manager in an IOV management partition. Thus, in order to understand the mechanisms of the illustrative embodiments, it is important to first understand how I/O virtualization may be implemented in a system utilizing a hypervisor or other virtualization platform. It should be appreciated that while the illustrative embodiments will be described with regard to Peripheral Component Interconnect Express (PCIe) adapters or endpoints, the present invention is not limited to such. Rather, the mechanisms of the illustrative embodiments may be implemented in any I/O fabric that supports I/O virtualization within the I/O adapters. Moreover, it should be appreciated that while the illustrative embodiments will be described in terms of an implementation in which a hypervisor is utilized, the present invention is not limited to such. To the contrary, other types of virtualization platforms other than a hypervisor, whether implemented in software, hardware, or any combination of software and hardware, currently known or later developed, may be used without departing from the spirit and scope of the present invention.

Figure 2:
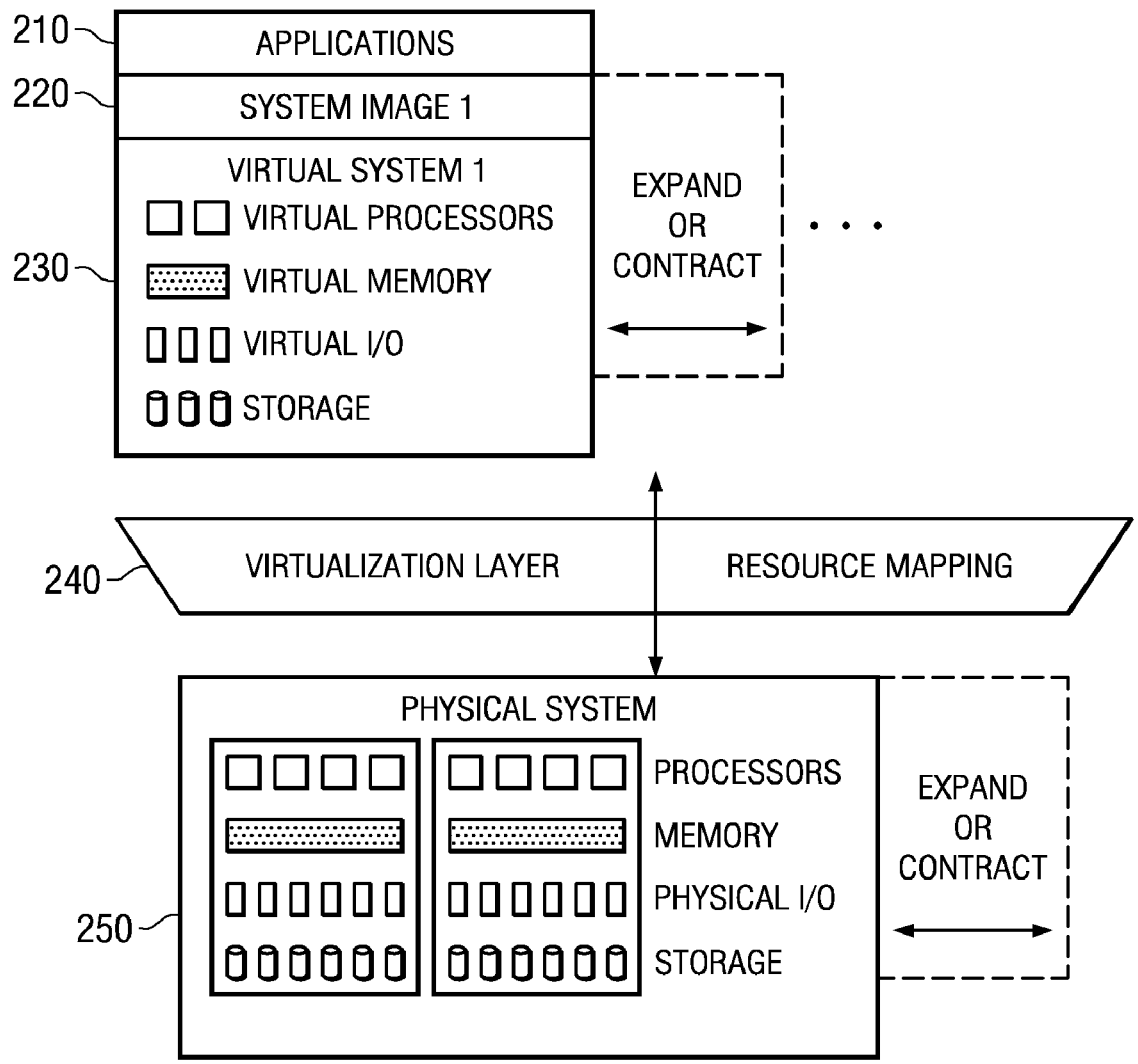
FIG. 2 is an exemplary diagram illustrating system virtualization as is generally known in the art.

FIG. 2 is an exemplary diagram illustrating system virtualization as is generally known in the art. System virtualization is the division of a physical system's processors, memory, I/O adapters, storage, and other resources where each set of resources operates independently with its own system image instance and applications. In such system virtualization, virtual resources are composed from physical resources and operate as proxies for physical resources, e.g., memory, disk drives, and other hardware components with architected interfaces/functions, having the same external interfaces and functions. System virtualization typically utilizes a virtualization layer which creates virtual resources and maps them to the physical resources thereby providing isolation between virtual resources. The virtualization layer is typically provided as one of, or a combination of, software, firmware, and hardware mechanisms.

As shown in FIG. 2, typically in a virtualized system, an application 210 communicates with a system image (SI) 220 which is a software component, such as a general or special purpose operating system, with which specific virtual and physical resources are assigned. The system image 220 is associated with a virtual system 230 which is comprised of the physical or virtualized resources necessary to run a single SI instance, e.g., virtualized processors, memory, I/O adapters, storage, etc.

The system image 220, via the use of the virtual system 230, accesses physical system resources 250 by way of the virtualization layer 240. The virtualization layer 240 manages the allocation of resources to a SI and isolates resources assigned to a SI from access by other SIs. This allocation and isolation is often performed based on a resource mapping performed by the virtualization layer 240 and one or more resource mapping data structures maintained by the virtualization layer 240.

Such virtualization may be used to allow virtualization of I/O operations and I/O resources. That is, with regard to I/O virtualization (IOV), a single physical I/O unit may be shared by more than one SI using the virtualization layer 240 which may be partially or wholly implemented as a hypervisor. The hypervisor may be software, firmware, or the like, that is used to support IOV by intervening on, for example, one or more of configuration, I/O, and memory operations from a SI, and direct memory access (DMA), completion, and interrupt operations to a SI.

Figure 1:
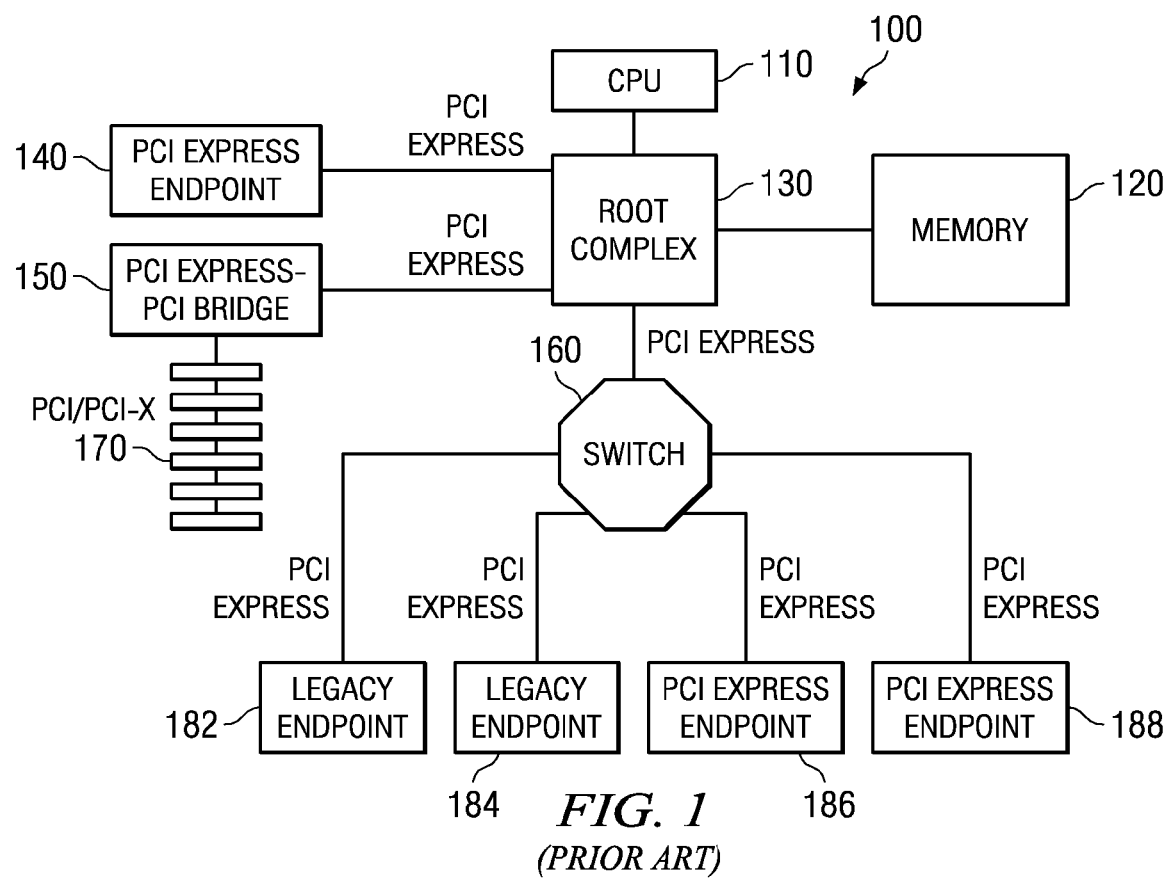
FIG. 1 is an exemplary diagram illustrating a system incorporating a PCIe fabric topology as is generally known in the art.
Figure 3:
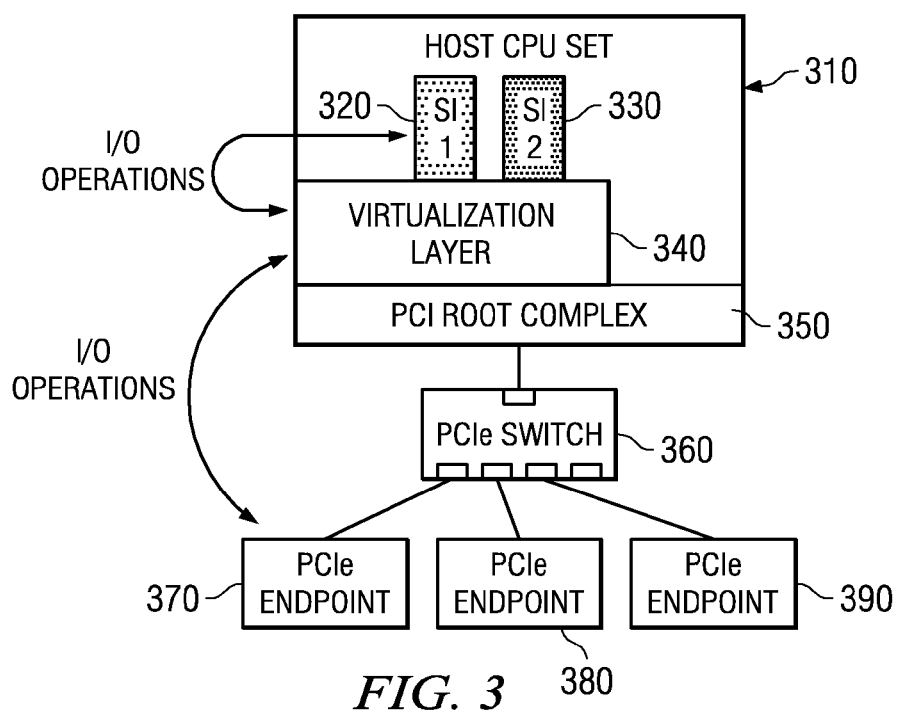
FIG. 3 is an exemplary diagram illustrating a first approach for virtualizing I/O of a PCI root complex using a virtualization layer.

FIG. 3 is an exemplary diagram illustrating a first approach to virtualizing I/O of a PCI root complex using an virtualization layer. As shown in FIG. 3, a host processor set 310, which may be one or more processors of a chip, motherboard, blade, or the like, may support a plurality of system images 320-330 through which applications (not shown) may access system resources, such as PCIe endpoints 370-390. The system images communicate with the virtualized resources via the virtualization layer 340, PCIe root complex 350, and one or more PCIe switches 360, and/or other PCIe fabric elements.

With the approach illustrated in FIG. 3, the virtualization layer 340, which may be implemented partially or wholly as a hypervisor or other type of virtualization platform, is involved in all I/O transactions and performs all I/O virtualization functions. For example, the virtualization layer 340 multiplexes I/O requests from the various SIs' I/O queues onto a single queue in the PCIe endpoints 370-390. Thus, the virtualization layer 340 acts as a proxy between the SIs 320-330 and the physical PCIe endpoints 370-390.

Figure 4:
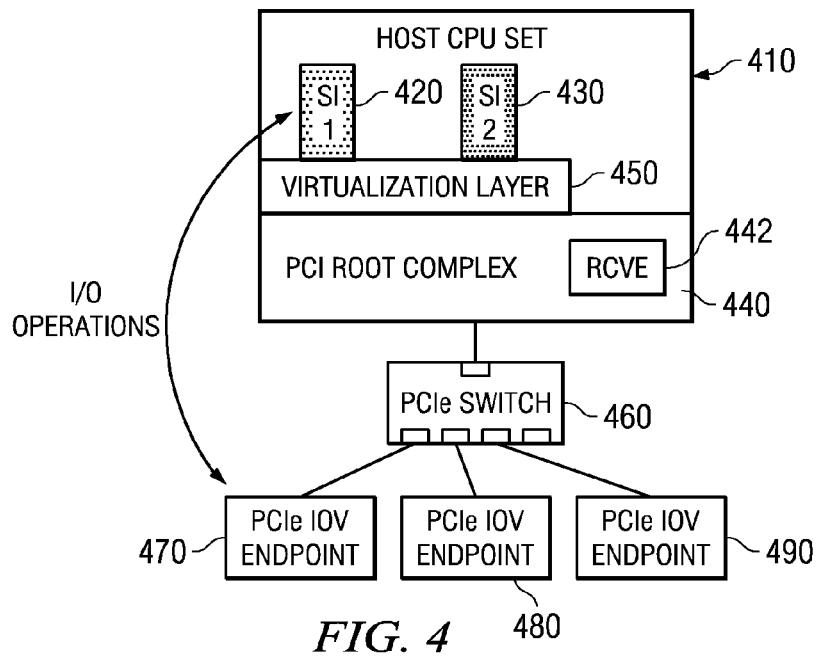
FIG. 4 is an exemplary diagram illustrating a second approach for virtualizing I/O of a PCI root complex using natively shared PCI I/O adapters.

FIG. 4 is an exemplary diagram illustrating a second approach to virtualizing I/O of a PCI root complex using natively shared PCI I/O adapters. As shown in FIG. 4, a host processor set 410, which may be one or more processors of a chip, motherboard, blade, or the like, may support a plurality of system images 420-430 through which applications (not shown) may access system resources, such as PCIe I/O virtualization (IOV) endpoints 470-490. The system images 420-430 communicate with the virtualized resources via the PCIe root complex 440 and one or more PCIe switches 460, and/or other PCIe fabric elements.

The PCIe root complex 440 includes root complex virtualization enablers (RCVE) 442 which may comprise one or more address translation and protection table data structures, interrupt table data structures, and the like, that facilitate the virtualization of I/O operations with IOV enabled endpoints 470-490. The address translation and protection table data structures may be used by the PCIe root complex 440 to perform address translation between virtual and real addresses for virtualized resources, control access to virtual resources based on a mapping of virtual resources to SIs, and other virtualization operations, for example. These root complex interrupt table data structures are accessible through the PCIe memory address space and are used to map interrupts to appropriate interrupt handlers associated with SIs, for example.

As with the approach shown in FIG. 3, a virtualization layer 450 is provided in the virtualization structure of FIG. 4 as well. The virtualization layer 450 is used with non-IOV enabled PCIe endpoints that may be coupled to the PCIe switch 460. That is, the virtualization layer 450, which may be partially or wholly implemented as a hypervisor or other virtualization platform, is utilized with PCIe endpoints in a similar manner as described previously above with regard to FIG. 3 for those PCIe endpoints that do not have native, i.e. internal to the endpoint, support for I/O virtualization (IOV).

For IOV enabled PCIe endpoints 470-490, the virtualization layer 450 is used primarily for configuration transaction purposes and is not involved in memory address space operations, such as memory mapped input/output (MMIO) operations initiated from a SI or direct memory access (DMA) operations initiated from the PCIe endpoints 470-490. To the contrary, data transfers between the SIs 420-430 and the endpoints 470-490 are performed directly without intervention by the virtualization layer 450. Direct I/O operations between the SIs 420-430 and the endpoints 470-490 is made possible by way of the RCVEs 442 and the built-in I/O virtualization logic, e.g., physical and virtual functions, of the IOV enabled PCIe endpoints 470-490. The ability to perform direct I/O operations greatly increases the speed at which I/O operations may be performed, but requires that the PCIe endpoints 470-490 support I/O virtualization.

Figure 5:
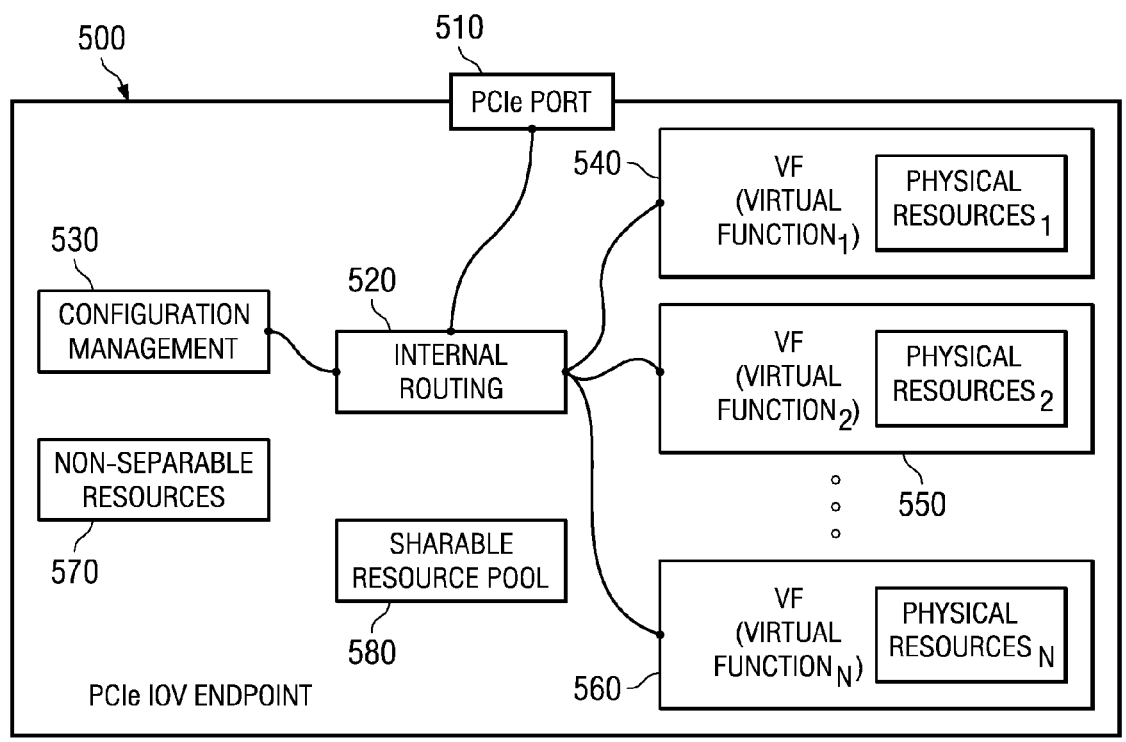
FIG. 5 is an exemplary diagram of a PCIe I/O virtualization enabled endpoint.

FIG. 5 is an exemplary diagram of a PCIe I/O virtualization (IOV) enabled endpoint. As shown in FIG. 5, the PCIe IOV endpoint 500 includes a PCIe port 510 through which communications with PCIe switches, and the like, of a PCIe fabric may be performed. Internal routing 520 provides communication pathways to a configuration management function 530 and a plurality of virtual functions (VFs) 540-560. The configuration management function 530 may be a physical function (PF) as opposed to the virtual functions 540-560. A physical "function," as the term is used in the PCI specifications, is a set of logic that is represented by a single configuration space. In other words, a physical "function" is circuit logic that is configurable based on data stored in the function's associated configuration space in a memory, such as may be provided in the non-separable resources 570, for example.

The configuration management function 530 may be used to configure the virtual functions 540-560. The virtual functions are functions, within an I/O virtualization enabled endpoint, that share one or more physical endpoint resources, e.g. a link, and which may be provided in the sharable resource pool 580 of the PCIe IOV endpoint 500, for example, with another function. The virtual functions can, without run-time intervention by a hypervisor, directly be a sink for I/O and memory operations from a system image, and be a source of Direct Memory Access (DMA), completion, and interrupt operations to a system image (SI).

PCIe endpoints may have many different types of configurations with regard to the "functions" supported by the PCIe endpoints. For example, endpoints may support a single physical function (PF), multiple independent PFs, or even multiple dependent PFs. In endpoints that support native I/O virtualization, each PF supported by the endpoints may be associated with one or more virtual functions (VFs), which themselves may be dependent upon VFs associated with other PFs.

The illustrative embodiments provide a system and method for management of an input/output virtualization (IOV) adapter, such as the IOV enabled PCIe endpoint 500 shown in FIG. 5, using an IOV management partition. The mechanisms of the illustrative embodiments address the situation where an input/output (I/O) fabric, which may comprise one or more PCIe switches such as PCIe switch 460 in FIG. 4, is shared by more than one logical partition (LPAR) of a host system and where each LPAR can potentially share with the other LPARs an I/O adapter (IOA), e.g., a PCIe endpoint 470-490 in FIG. 4.

In particular, with the mechanisms of the illustrative embodiments, each LPAR is assigned its own separate address space to access a virtual function (VF) assigned to it, and to receive interrupts directly from the VF assigned to it, such that each LPAR's perception is that it has its own independent IOA, or I/O endpoint, for purposes of normal I/O operations. Each VF of an IOA, such as a PCI Express (PCIe) I/O Virtual (IOV) adapter or endpoint, may be shared across multiple LPARs. The mechanisms of the illustrative embodiments provide facilities for management of the shared resources of the IOV adapter/endpoint via a Physical Function (PF) of the IOV adapter/endpoint (hereafter referred to only as an I/O endpoint) by assignment of that PF to an I/O Virtualization Management Partition (IMP). More specifically, the code running in the IMP acts as a virtual intermediary (VI) to the VFs for purposes of fully managing the VF error handling, VF reset, and configuration operations. In addition, the IMP acts as the interface to the PF for purposes of accessing common VF functionality (for example, the network addresses for the VFs for a network adapter), which will be referred to here as the I/O endpoint south-side management.

Figure 6:
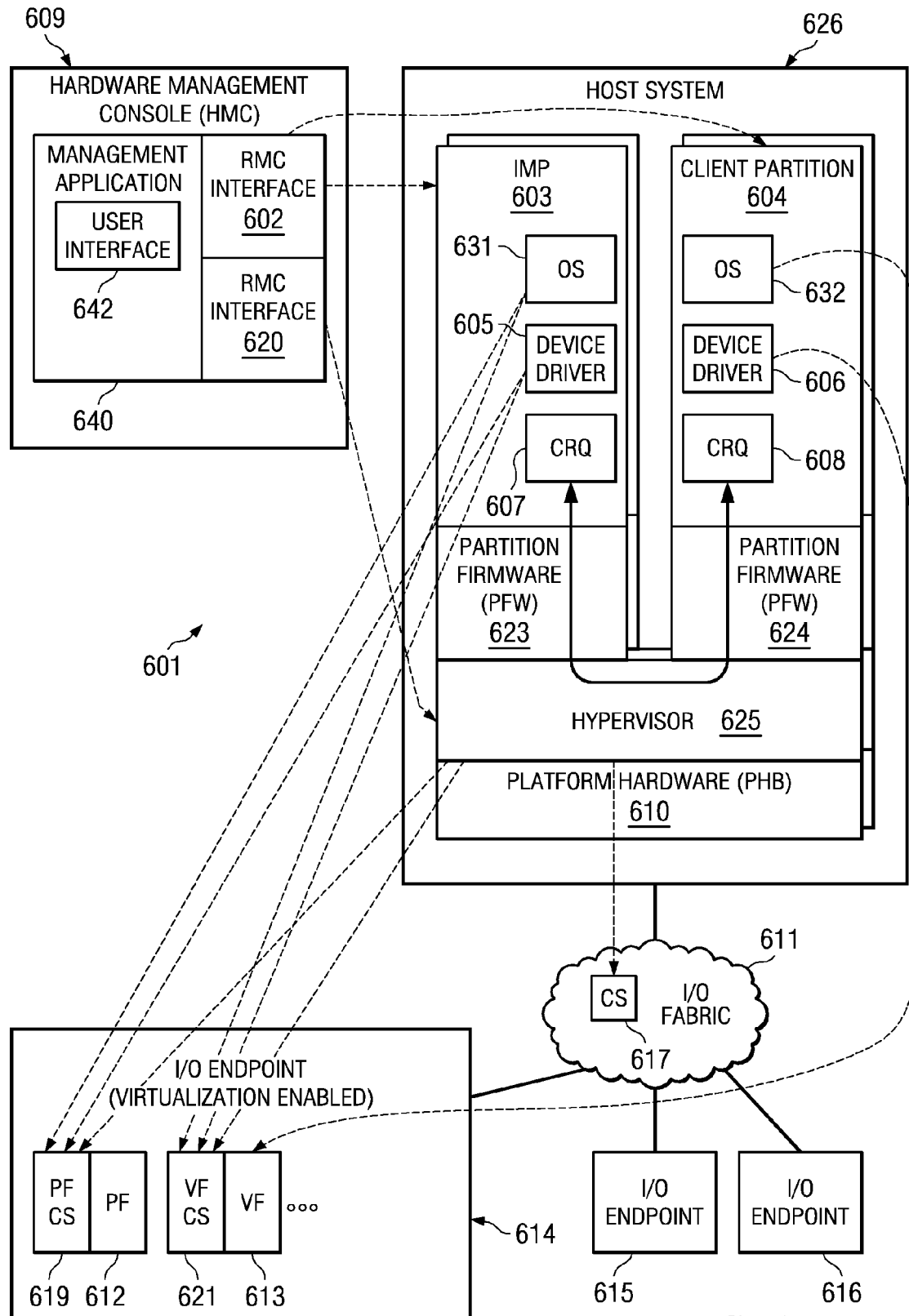
FIG. 6 is an exemplary diagram of a system structure in which IOV enabled endpoints, or adapters, are utilized in accordance with one illustrative embodiment.

FIG. 6 is an exemplary diagram of a system structure in which IOV enabled endpoints, or adapters, are utilized in accordance with one illustrative embodiment. The mechanisms shown in FIG. 6 may be implemented in conjunction with the mechanisms illustrated in FIG. 4. For example, the IMP 603 shown in FIG. 6 may be provided in association with system image 1 420 in FIG. 4 while client partition 604 in FIG. 6 may be provided in association with system image 2 430 of FIG. 4. Similarly, the I/O fabric 611 of FIG. 6 may include the PCIe switch 460 in FIG. 4, IOV endpoint 614 may be similar to any one of PCIe endpoints 470-490 in FIG. 4, and endpoints 615, and 616 may be either IOV enabled endpoints or non-IOV enabled endpoints, such as endpoints 370-390 in FIG. 3.

As shown in FIG. 6, the system 601 comprises a host system 626 which may be any data processing device, e.g., a server, client computing device, or the like, an I/O fabric 611 which may include one or communication links and one or more switches, and one or more I/O endpoints 614-616 which may be, in one illustrative embodiment, PCIe I/O endpoints with I/O endpoint 614 being an IOV enabled endpoint while the other endpoints 615-616 may be IOV enabled or non-IOV enabled endpoints. The host system 626 comprises platform hardware 610 which is the underlying hardware of the data processing device, a hypervisor 625, logical partitions (LPARS) 603 and 604, and corresponding partition firmware (PFW) 623 and 624. While the illustrative embodiments are described herein with regard to use with a hypervisor 625, it will be appreciated that other types of virtualization platforms may be utilized without departing from the spirit and scope of the present invention as previously mentioned above.

The hypervisor 625, in one illustrative embodiment, may be code that executes on the platform hardware 610, and is part of the platform's firmware. Similarly, the partition firmware (PFW) 623-624 may also be part of the platform's firmware, but is shown in association with the LPARs 603 and 604 since they are logically considered to be part of the LPARs' code executing within the LPAR.

The LPARs 603 and 604 have allocated resources and an operating system image or instance that executes within the LPAR. In addition, the LPARs 603 and 604 may execute other applications, software, code, or the like within the LPAR. For example, with particular importance to the illustrative embodiment's one of the LPARs, e.g., LPAR 603, executes code that causes the LPAR 603 to operate as an IOV Management Partition (IMP) 603. Other LPARs 604 may operate as client partitions. The IMP 603 and client partition 604 are permitted to communicate with one another for purposes of IOV resource assignment and functional management via the Command/Response Queue (CRQ) mechanism 607-608, which will be described in greater detail hereafter. While only one IMP 603 and one client partition 604 are shown in FIG. 6, it should be appreciated that more than one IMP 603 and client partition 604 may be provided in a host system 626 without departing from the spirit and scope of the illustrative embodiments.

The hypervisor 625 has access to configuration spaces 619, 621 of the IOV endpoint 614 and to the I/O fabric 611 configuration space 617. The term "configuration space" as it is used herein refers to a disjoint address space from the memory mapped I/O (MMIO) address space that is allocated for use in storing configuration data for a particular component of the system 601. Further, the IMP's operating system 631 and device driver 605 have access to the configuration space 619 for the Physical Functions (PFs) 612 when they are assigned to the IMP 603, and have access to the configuration spaces 621 of the Virtual Functions (VFs) that belong to the PF assigned to the IMP 603. The client partition's operating system 632 and device driver 606 do not have direct access to any of the configuration spaces 621 of the VFs which are assigned to them, and therefore, must access these configuration spaces 621 through the CRQ mechanisms 607-608 and the IMP 603. By blocking the client partition's access to the VF configuration spaces 621, the software in the IMP 603 acts as an intermediary, or more specifically, as a Virtual Intermediary (VI) to make sure that the client partitions 604 are permitted to access the configuration spaces 621. In this way, the IMP 603 provides, to a client partition 604, access to the configuration spaces 621 that they need to properly operate their VFs 613, but not to configuration spaces that could cause problems for other client partitions. That is, the client partitions 604 only have access to the configuration space allocated for their VFs 613.

A management application 640 on a Hardware Management Console (HMC) 609, which may be resident on the host system 626 or in a separate data processing device (as shown), and the HMC 609 itself communicate through a Remote Management Command (RMC) interface 602 to the IMP 603 and client partitions 604 and through the same type interface 620 to the hypervisor 625. The management application 640 (referred to hereafter collectively with the HMC 609 as simply as the HMC 609), acts as the orchestrator to control functionality across the various components in the system 601, and provides a user interface 642 for a human to view system configurations and to input information about what resources that they want assigned to what LPARs 603-604. The management application 640 may provide many different functions which may be invoked by the user as described in greater detail hereafter. Alternatively, these functions may be automatically invoked without user intervention in response to an event or input triggering the initiation of such functions.

As mentioned above, the client partitions 604 must communicate with the IMP 603 in order to access the configuration spaces 621 of their virtual functions (VFs) 613 in an IOV enabled endpoint 614. In order to provide an interface for such communication, the Command/Response Queue (CRQ) mechanisms 607 and 608 are utilized. These CRQ mechanisms 607 and 608 comprise send and receive queues through which Command/Response (C/R) requests are posted and received.

Figure 7:
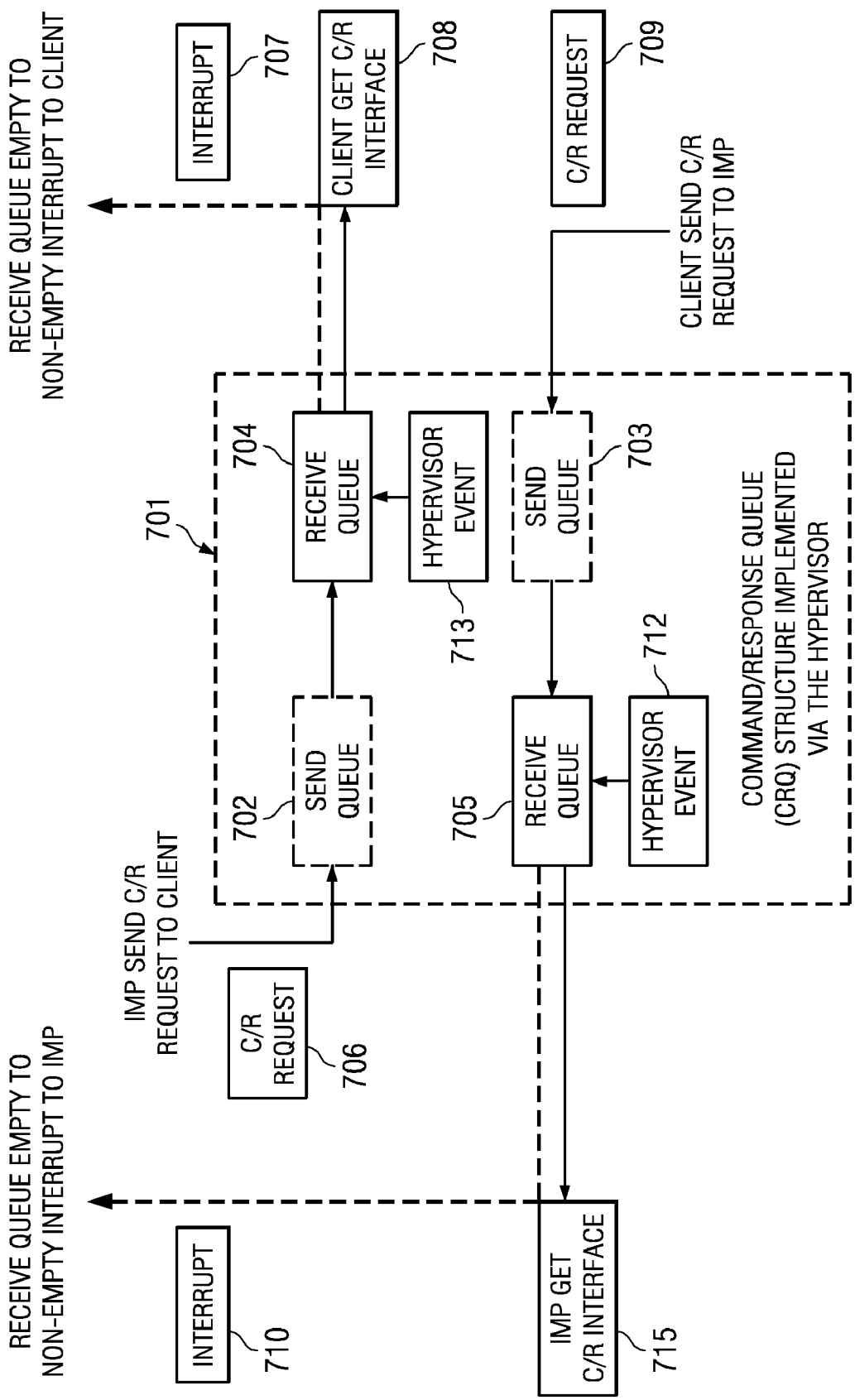
FIG. 7 is an exemplary diagram illustrated details of an exemplary implementation of a Command/Response Queue (CRQ) structure in accordance with one illustrative embodiment.

FIG. 7 is an exemplary diagram illustrated details of an exemplary implementation of a Command/Response Queue (CRQ) structure in accordance with one illustrative embodiment. There are many ways in which a CRQ structure may be implemented, with FIG. 7 representing but one illustrative embodiment of such a structure. The CRQ 701 may be implemented, for example, in the hypervisor 625 of FIG. 6 with hypervisor interfaces (not shown) being provided to both the IMP 603 and client partitions 604 to allow for queuing requests between these LPARs 603-604.

As shown in FIG. 7, and with continued reference to FIG. 6, the CRQ 701 is composed of receive queues 704-705, one for each direction of communication, i.e. to client partition 604 from the IMP 603 and from the client partition 604 to the IMP 603, and potentially a send queue 702-703 for each direction of communication. The IMP 603 may send a C/R request to the client partition 604 by posting the C/R request 706 to the IMP's associated send queue 702. In addition, the hypervisor 625 may post events 713 that relate to the send queue's operation on the receive queue 704, which is associated with a particular client partition 604. When an event 713 or C/R Request 706 is queued on the receive queue 704, and the queue was previously empty, an interrupt 707 is sent to the client partition 604. The client partition 604, upon receipt of the interrupt 707 via its CRQ interface, may read all entries (the one that caused the interrupt and any subsequent ones that were added) by utilizing a client get command/response interface 708 that is provided by the hypervisor 625.

Similarly, in the opposite direction, the client partition 604 may post C/R requests 709 to the send queue 703 associated with the client partition 604 in the CRQ structure 701. The hypervisor 625 may also post events 712 to the receive queue 705 associated with the IMP 603. When an event 712 or C/R Request 709 is queued on the receive queue 705, and the queue was previously empty, an interrupt 710 is sent to the IMP 603. In response to the interrupt 710, the IMP 603 may retrieve its C/R requests from the receive queue 705 using a client get command/response interface 715 of the hypervisor 625 interface.

It should be noted that the client and IMP "get" interfaces are to the receive queues, not the send queues. The send queues are present for the send interfaces. As indicated by the arrows from the send to receive queues, something that is posted to the send queue by one end is transferred to the receive queue on the other end. The send queues are optional, because the hypervisor may take the requests and put them directly into the receive queues instead of having the intermediate step of implementing a send queue.

FIG. 8A is an exemplary diagram illustrating a definition of a set of exemplary CRQ hypervisor events in accordance with one illustrative embodiment. FIG. 8B is an exemplary diagram illustrating a definition of a set of CRQ client requests along with the expected corresponding responses in accordance with one illustrative embodiment. Thus, FIGS. 8A-8B provide examples of the types of events and client requests which may be posted to send and receive queues of the CRQ structure 701 in FIG. 7. The CRQ events reference "partners" since these CRQ events may be posted to either the client or the IMP associated receive queues. The "partner" is the other party in a connection between an IMP and a client partition, via the CRQ structure, that is not the party with which the receive queue, to which the event is posted, is associated.

As shown in FIG. 8A, the "partner partition connected" event 802 is a way for the hypervisor, e.g., hypervisor 625 in FIG. 6, to inform the IMP, e.g., IMP 603 in FIG. 6, and client partition, e.g., client partition 604 in FIG. 6, that both ends of the connection between the IMP 603 and a client partition 604 are ready. It should be appreciated that the "connection" is established between the IMP 603 and the client 604 when the CRQ structure is initialized in the hypervisor 625. In response to the event 802, the client partition 604 changes the state of the IMP to a "connected" state and, for initial connections, the client partition 604 may load a device driver for communication between the CRQ and the IMP and potentially for obtaining VF resources. The IMP 603 also changes the state of the client partition 604 in the memory of the IMP 603 to a "connected" state in response to the event 802 and, for an initial connection, may communicate available resources to the client partition 604.

The "partner partition failed" event 804 informs the IMP 603 or client partition 604 receiving this event 804 that the other side or end of the connection is no longer available and recovery is necessary, e.g., the other side of the connection has crashed and is in the process of rebooting. In this case, the partner is expected to return and the partition, i.e. the IMP 603 or the client partition 604 that received the event 804 in its receive queue, is expected to wait for a partner partition connected event 802 and then re-establish the communication link. In response to the "partner partition failed" event 804, the client partition 604 responds by changing the state of the IMP 603 to a "not connected" state. The VF 613 may continue to be used by the client partition 604 until a CRQ linkage is needed, for example to access the VF configuration space 621. If the state of the IMP 603 is "not connected" at the time the CRQ linkage is needed, i.e. a "partner partition connected" event 802 has not been received in the mean time, then an error recovery state is entered. The IMP 603 responds by changing the state of the client partition 604 to a "not connected" state.

The "partner partition terminated connection" event 806 informs one side or end of the connection that the other side or end of the connection has intentionally closed the connection for some reason or that the hypervisor 625 has detected a crash with no expected reboot. In either case the recipient of the "partner partition terminated connection" event 806 should not expect that the partner will return. In response to this event 806, the client partition 604 terminates VF usage and posts an error event to its error log. The IMP 603 responds by requesting that the hypervisor 625 rescind the resources that it has assigned to the client partition for the VF.

Moving now to FIG. 8B, the client to IMP requests in FIG. 8B include an error response 812 from the IMP 603 if any request is made that is invalid. This might happened, for example, if there was a programming error that created a request that was not valid or which included invalid parameters for the request, such as an invalid address.

The client to IMP requests in FIG. 8B further include a configuration request 814 which is used by the client partition 604 to get the IMP 603 to perform a configuration read operation on the configuration space of the VFs and PFs of the IOV enabled adapter/endpoint 614, which are associated with the client partition 604, on behalf of the client partition 604. Similarly, the client to IMP requests further include a configuration write request 816 which is used by the client partition 604 to get the IMP 603 to perform a configuration write operation to the configuration space of the VFs and PFs of the IOV enabled endpoint 614, which are associated with the client partition 604, on behalf of the client partition 604. With these requests 814 and 816, the IMP 603 acts as an intermediary for configuration requests and does not allow access to the configuration space of the VFs and PFs of the IOV enabled adapter/endpoint 614 if doing so will compromise other client partitions, e.g., the VFs and PFs are not associated with the client partition 604 that sent the request. The appropriate ranges of associations is made as part of the initial configuration operation, where the hypervisor 625 passes to the IMP 603 the I/O configuration structure associated with each CRQ 607 and 608, specifying what are valid configuration address ranges, and so on, for each CRQ 607, 608. If the access would compromise the security of other client partitions, an error result is returned by the IMP 603. If the access would not compromise the security of other client partitions, then the read/write operation is performed and the results returned to the client partition 604 from the IMP 603.

The client partition 604 may further issue a reset VF request 818 to have the IMP 603 reset a VF associated with the client partition 604 using a Function Level Reset (FLR), for example.

The client partition also has a set of error handling requests that it can make. The "query error state of VF" request 820 requests that the IMP 603 inform the client partition 604 if the VF has encountered an error. The IMP 603 response is to return the error state or, if unable to return the error state information, such as due to the client partition 604 not being permitted to access the configuration space of the VF, to return an error response to the client partition 604.

The "Enable Load/Store to VF" request 822 requests that the IMP 603 allow the unblocking of MMIO Load and Store operations to the VF, as when the VF is in an error state. This allows the device driver 606 to be able to issue MMIO Load operations to its VF after an error, to try to gather information from the VF as to what might have occurred, as well as information identifying which operations may be restarted and which ones may not be restarted. The IMP 603 response is to remove the VF from the MMIO error state and return a success response or, if unable to remove the VF from the MMIO error state, such as due to the client partition 604 not being permitted to access the configuration space of the VF, return an error response.

The "get I/O fabric error information" request 824 requests that the IMP 603 allow the client partition 604 to get more than just error information from its VF, allowing it to capture debug data or data that could allow for better fault isolation. The IMP 603 response is to gather fabric error register data and return that data to the client partition 604 assuming the client partition 604 is permitted to access such data. If the client partition 604 is not permitted to access such data, then an error response is returned.

The HMC 609 may also orchestrate a dynamic removal of a VF from a client partition 604. The "VF operations terminated due to dynamic remove command" request 826 is a way for the client partition to IMP communications to be gracefully terminated. In response to the request 826 coming from the client partition 604, the IMP 603 acknowledges the request 826, requests that the hypervisor 625 rescind the resources that it previously asked the hypervisor 625 to assign to the client partition 604, and stops using the CRQ 608 to communicate with the client partition 604.

Finally, there may be unique driver information that needs to be passed from the client partition's device driver 606, associated with the VFs and thus referred to as the "VF driver", to the device driver 605 in the IMP 603, which is associated with the PF and thus referred to as the "PF driver". The VF driver to PF driver communications request 828 allows this to happen in a transparent manner to the platform firmware and hypervisor 625.

The IMP 603 to client partition 604 requests in FIG. 8C include an error response 852 from the client partition 604 if any request is made that is invalid. This might happened, for example, if there was a programming error that created a request that was not valid or which included invalid parameters for the request, such as an invalid address. The resource available request 854 may be used by the IMP 603 to pass control of resources from the IMP 603 to the client partition 604. For example, when a VF is to be reassigned from the IMP's control to the client partition's control, the IMP 603 may pass control of the MMIO address space for the VF, DMA address space for the VF, interrupts for the VF, and so on, to the client partition 604. The IMP 603 does this by using the resource available request 854 to pass one or more tokens to the client partition 604 that represents this resource. The token may be obtained, for example, from the IMP 603 asking the hypervisor 625 for a token that represents the resource, as will be detailed later. The response of the client partition 604 to the resource available request 854 is to save the tokens passed for future use and to call the hypervisor 625, passing the token to the hypervisor 625 so that the hypervisor 625 may remap the resource from the IMP's resources to the client partition's resources. Also, after receiving the resource available request 854 the client partition 604 may then query, via the CRQ mechanism 608, the VF configuration space associated with the CRQ 608, and load the device driver, e.g., device driver 606, for the VF.

When the IMP 603 needs to get a resource that it has reallocated to a client partition 604 back into its own resource pool, for example for a hot plug operation of the IOV enabled adapter/endpoint 615, the IMP 603 may send a return resource request 856 to the client partition 604. The client partition's response is to stop using the VF, request reset of the VF through the CRQ mechanism 608, remove the device driver, e.g., device driver 606, for the VF, remove the VF from the OS's fabric configuration, and call firmware to remove the VF from the client partition 604.

Again, the events 800 in FIG. 8A may be posted to receive queues of the CRQ structures 607 and 608 in the IMP 603 and client partition 604 by the hypervisor 625. The client requests 810 of FIG. 8B may be posted by the client partition 604 in its send queue of its CRQ structure 608 to be sent to the IMP 603 via its receive queue of its CRQ structure 607. The IMP requests 850 of FIG. 8C may be posted by the IMP partition 603 in its send queue of its CRQ structure 607 to be sent to the client partition 604 via its receive queue of its CRQ structure 608. Examples of the usage of these CRQ hypervisor events 800, CRQ client commands 810, and CRQ IMP requests 850 will be described hereafter.

FIG. 9 is an exemplary diagram illustrating a definition of a set of exemplary Logical Partition (LPAR) to platform firmware calls in accordance with one illustrative embodiment. In particular, FIG. 9 illustrates exemplary platform firmware calls 900 that can be used to implement aspects of the illustrative embodiments, as well as to which partitions (client or IMP) that these calls apply. These calls may be performed by the partitions 603 or 604 to the associated platform firmware 623 or 624 in FIG. 6, for example. Examples of the usage of these LPAR to platform firmware calls 900 will be given in the descriptions of various ones of FIGS. 11A-19 hereafter.

As shown in FIG. 9, the add command (request) or response to CRQ of partner LPAR call 902 is a call used to send a command/request or response on the CRQ 607 or 608. This call may be used by the client partitions 604 and the IMP 603. The get command (request) or response from CRQ call 904 is a call used to get the next queued command/request or response off queues of the CRQ 607 or 608.

The set of calls 906-916 are calls used by the IMP 603 for the purpose of accessing the facilities that are not directly available to the client partition 604. Thus, as shown in FIG. 9, these calls cannot be used by the client partition 604 but may be used by the IMP 603. These calls 906-916 are used in the code in the IMP 603 that satisfies the requests queued on the CRQ 607 from the client partitions 604, or are used in general PF control and recovery. The read/write I/O configuration space call 906 is used by the IMP 603 to perform a read or write operation to the configuration space of a VF on behalf of a client partition 604. Such a call may be made by the IMP 603, for example, in response to receiving a request 814 or 816 in FIG. 8B from a client partition 604 that has permission to access the targeted VF.

The reset PF call 908 is one of the PF specific calls that may be made by the IMP 603. This call resets the PF, and as a result, also resets all the VFs associated with the PF. When this call is made, the IMP 603 must first use the disable VF call 910 to disable all VFs associated with the PF, reset the PF, and then restore all the VF configurations to what they were before the PF reset.

The disable VF call 910 informs the platform firmware to disable any further MMIO operations to the VF and to prevent Direct Memory Access (DMA) and interrupts from the VF from getting through to the client partition 604. There are a number of ways to implement this to make sure that data integrity issues do not happen. In one illustrative embodiment, the hardware may be designed in such a way that if a client partition 604 tries to perform a MMIO Load operation from its VF, the client partition 604 may receive back all-1's data, just as though the VF was not there. The device driver 606 is expected to check for all-1's data when it is not expecting all-1's data, and to use the query error state for VF CRQ request 820 to verify whether or not the all-1's represents an error state. The disable VF call 910 is expected to be used primarily in error recovery scenarios and thus, may invoke the VF driver, e.g., device driver 606, to enter into its own recovery, as described above and further described hereafter.

The query PF and VF error state call 912 is a call to the platform firmware that allows the IMP 603 to get the information necessary to satisfy the query error state for VF CRQ client request 820. The call 912 also allows the PF driver, e.g., device driver 605, to do the equivalent error recovery with the PF that is available to the VF.

To obtain platform error data for error recovery, the enable PF and VF for Load and Store operations call 914 and query I/O fabric error information call 916 are provided. The former is provided for the implementation of the enable Load/Store to VF CRQ client request 822 and the latter to implement the get I/O fabric error information CRQ client request 824. Also, these may be used by the IMP 603 for PF error recovery.

The query interrupt source call 918 is used on all interrupts to get the interrupt source in order to virtualize the interrupt controller. Thus, as depicted in FIG. 9, the query interrupt source call 918 may be used by both the client partition 604 and the IMP 603.

The setup DMA translation call 920 is used to setup a translation mechanism for translating an I/O address to a system address. Such address translation mechanisms are required for I/O virtualization. The setup DMA translation call 920 may be used by the client partition 604 but not generally the IMP 603 because the PF does not generally need to do DMA operations to the IMP 603.

The Add/Remove adapter from LPAR use call 922 may be used by the IMP 603 but not the client partitions 604. The client partition 604 is not permitted to change the IOV adapter/endpoint in any way and thus, cannot use the Add/Remove adapter from LPAR use call 922 since allowing the client partition 604 to do so may pose a security issue for VFs associated with other client partitions that are associated with the PF.

The set of calls 924-932 are calls used by the IMP 603 and client partition 604 for the purpose of passing resources back and forth between the IMP 603 and client partitions 604. Each of these calls 924-932 are usable only by one or the other partitions, as indicated in 900. The grant logical resource call 924 is used by the IMP 603 to pass the resource to the hypervisor 625 that is to be reassigned to a client partition 604 and, in return, the hypervisor 625 passes back an identifier, such as a number, referred to as a token. The IMP 603 then passes this token to the client partition 604 that is to receive the resource, for example by passing the token via the resource available CRQ IMP request 854. The client partition 604 then uses the accept logical resource 926 call to pass the received token to the hypervisor 625 which reassigns the resource from the IMP 603 to the client partition 604.

The return logical resource call 928 allows the client partition 604 to give up resources that it no longer needs, for example in a VF remove operation which will be detailed later. The rescind logical resource (normal) 930 and rescind logical resource (forced) calls 932 allow the IMP 603 to get back resources that it originally gave up to a client partition 604. The normal call 930 is used to get back resources that the client partition 604 has returned via the return logical resources call 928. The forced call 932 is used in error conditions, where the client partition 604 either refuses to relinquish control, for example, through a program error, or in cases like client partition crashes. The forced call 932 tells the hypervisor 625 to remove the resources from the client partition's usage, regardless of the consequences to the client partition 604. For example, the forced call 932 may cause the client partition 604 to crash. Thus, the forced call 932 is used only in unusual circumstances.

FIG. 10 is an exemplary diagram illustrating a definition of a set of exemplary Hardware Management Console (HMC) to platform requests and responses in accordance with one illustrative embodiment. In particular, FIG. 10 illustrates exemplary HMC to platform firmware request/responses 1000 and identifies to which component in the system that this request is expected to be made as well as the component's expected response. These calls may be made, for example, by the HMC 609 in FIG. 6, via one or more of the interfaces 602 and 620. For example, if the HMC 609 makes a call that is targeting either the IMP 603 or the client partition 604, the HMC 609 may make the call via the RMC interface 602. If the HMC 609 is making a call that targets the hypervisor 625 then the call may be made via the interface 620. Examples of the usage of these HMC to platform requests/responses 1000 will be provided in greater detail with regard to various ones of FIGS. 11A-19 hereafter.

As shown in FIG. 10, the hypervisor 625 may be queried for the I/O fabric configuration by use of the query I/O fabric configuration (hypervisor) request 1002. This request 1002 may be used by the HMC 609, for example, on initial system bring-up to get all the possible I/O devices, so that these can be presented to the user for selection and assignment to the various LPARs that the user wishes to configure.

The IMP 603 may be queried for the I/O fabric configuration by use of the query I/O fabric configuration (IMP) request 1004. This query I/O fabric configuration (IMP) request 1004 may be used by the HMC 609, for example, after an IOV adapter 614 is assigned to an IMP 603 and the IMP 603 has had time to determine the IOV capability on the IOV adapter 614, to get all the possible I/O PFs and VFs on the IOV adapter 614, so that these can be presented to the user for selection and assignment of the VFs to the various LPARs that the user wishes to configure.

The set LPAR I/O configuration request 1006 is used by the HMC 609 to inform the hypervisor 625 what the user at the HMC 609 has decided to configure. This configuration includes not only the I/O configuration, but also the LPAR configuration characteristics, such as the number of CPUs assigned and the amount of memory assigned to the various LPARs in the system.

The set initial VF to client partition assignments request 1008 is used by the HMC 609 to inform the IMP 603 what the user at the HMC 609 has decided to configure. This configuration includes the reassignments of VFs resources that are currently owned by the IMP 603 to the various client partitions 604. In response to this, the IMP 603 enables the IOV capability of the IOV adapter 614 and performs the operations to share the VF resources with the specified client partitions 604.

The hypervisor 625 or IMP 603 may also be informed by the HMC 609 when to power up and power down an I/O adapter or endpoint. This may be accomplished through the power up/down IOA request 1010.

There are several HMC to platform requests 1012-1016 that are used by the HMC to direct the dynamic addition of an IOV adapter 614 to the system 601 or VF to a client partition 604, i.e. while the system is operational and after initial configuration. The dynamic assignment of an IOV adapter request 1012 is used by the HMC 609 to inform the hypervisor 625 to allocate an IOV adapter 614 to an IMP 603 along with the system resources necessary to operate that adapter, for example MMIO address space, DMA address space, and interrupts.

Once the hypervisor 625 has completed the dynamic add of an IOV adapter request 1012, the IMP 603 may be informed of any additions. The dynamic add of an IOV adapter to an IMP request 1014 informs the IMP 603 that a new IOV adapter 614 to be added. This might happen, for example, on a hot plug add of an I/O adapter or endpoint to a system, as discussed hereafter. This request 1014 informs the IMP 603 to add the IOV adapter to its fabric configuration, initialize the PF configuration spaces, and load the PF device driver.

The dynamic add/remove of a VF request 1016 to an IMP 603 informs the IMP 603 to add or remove the resources for a VF, e.g., the CRQ mechanism and any supporting structures necessary to support a specific VF, and to begin or terminate communications with the client partition 604 via the CRQ mechanism that there is a VF available to be added or that it is time to remove a VF that was previously allocated to that client partition 604.

There are several HMC to platform requests 1018-1020 that are used by the HMC 609 to direct the dynamic removal of an IOV adapter from the system, i.e. while the system is operational and after the initial configuration. The dynamic remove of an IOV adapter (hypervisor) request 1018 is used by the HMC 609 to inform the hypervisor 625 to remove the resources for an IOV adapter from an IMP, for example assigned MMIO address space, DMA address space, and interrupts.

The dynamic remove of an IOV adapter (IMP) request 1020 informs an IMP 603 that an IOV adapter is to be removed. Prior to issuing this request, the HMC 609 must have removed all VFs associated with the PF from the using client partitions 604, as described above. Removal of an IOV adapter might happen, for example, on a hot plug remove of an I/O adapter or endpoint from a system. This request 1020 informs the IMP 603 to stop using the PF, request reset of the PF through the reset call 908, remove the device driver, and remove the PF from the OS's fabric configuration.

An important function of the IMP 603 is to provide secure access to resources of the I/O adapter or endpoint that are either shared across the multiple LPARs that are using the VFs associated with a PF, or are unique to a VF but which should not be accessible for change by the PF. One example of such a resource of a network I/O adapter or endpoint is the network address associated with a PF which is shared by the VFs, or a network address that is unique to a VF. Management of these device-specific resources will be referred to here as "south side" management of the I/O adapter or endpoint. This is accomplished through the HMC 609 by the I/O adapter (IOA), or endpoint, south side management request 1022, and all such management is secured via a security application on the HMC 609, e.g., a logon application or other authentication application. When the IMP 603 receives an IOA south side management request 1022 for an IOA, the IMP 603 passes the request to the device driver 605 for the PF, and the device driver 605 makes the device-specific request through a PF interface to the IOA in order to accomplish the request.

The current status of all of the HMC to platform requests 1000 may be made to the target of the original request by use of the query previous command completion and status request 1024. This allows the HMC 609 to coordinate a series of HMC requests, and to indicate to the user through an HMC interface a status of a previous request. Such a request may be made because some operations may be rather slow to complete and it is desirable to be able to access the current statues of such requests.

The present description now turns to a more detailed explanation of the use of the various requests and calls illustrated above in FIGS. 8A-10. FIGS. 11A-19 are flowcharts outlining various operations of the mechanisms of the illustrative embodiments. The operations outlined in FIGS. 11A-19 may be implemented by the various mechanisms, e.g., HMC, hypervisor, CRQ structure, IMP, client partition, platform firmware/hardware, I/O endpoint, and the like, depicted in FIG. 6, for example. Thus, where appropriate, reference will be made to elements of FIG. 6 as one example of the mechanisms of the illustrative embodiments that may participate in the performance of the operations outlined in FIGS. 11A-19.

It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

Figure 11A:
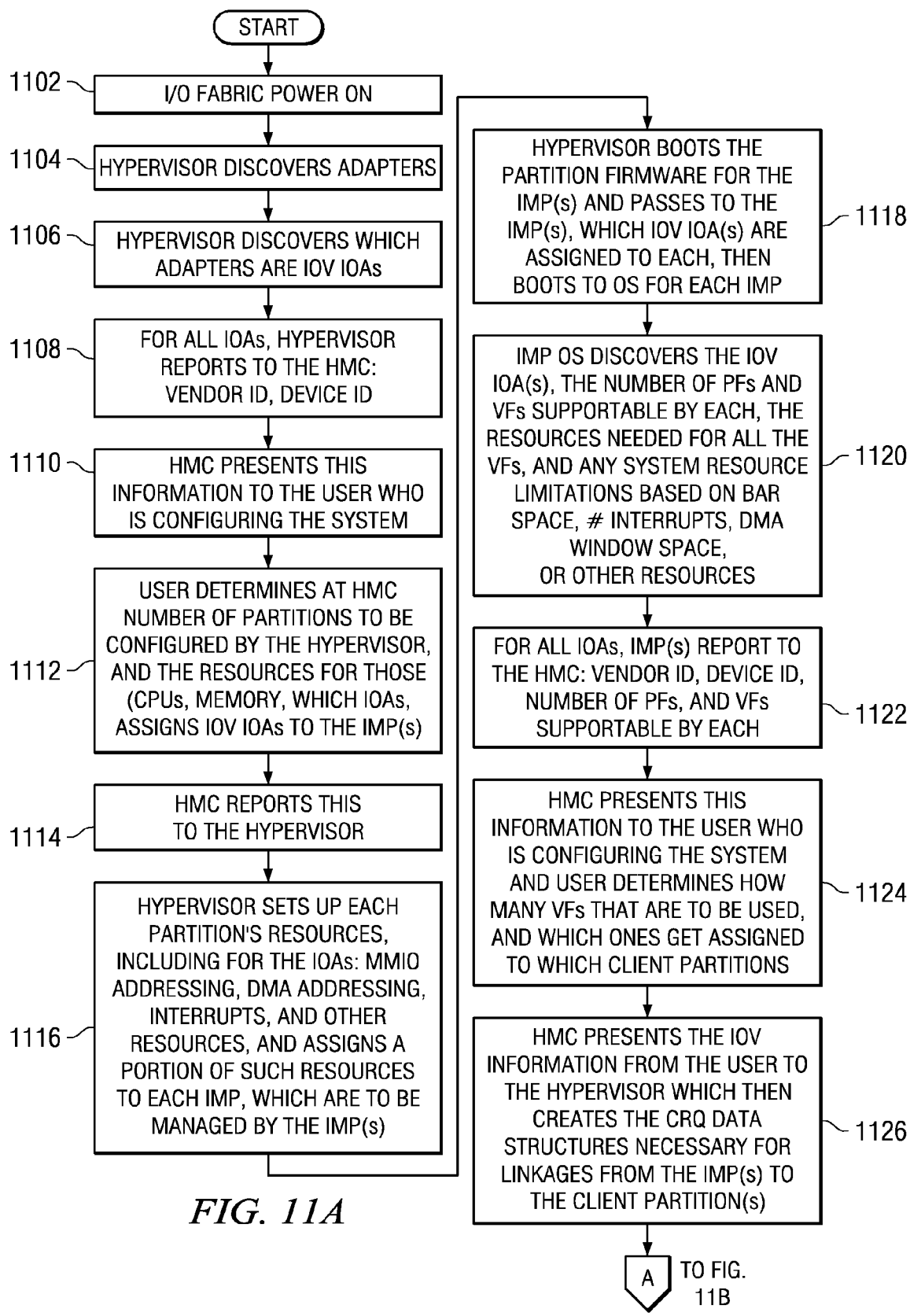
FIGS. 11A-11B are a flowchart outlining an exemplary "bring-up" operation for a system with I/O Virtualized (IOV) adapters in accordance with one illustrative embodiment.
Figure 11B:
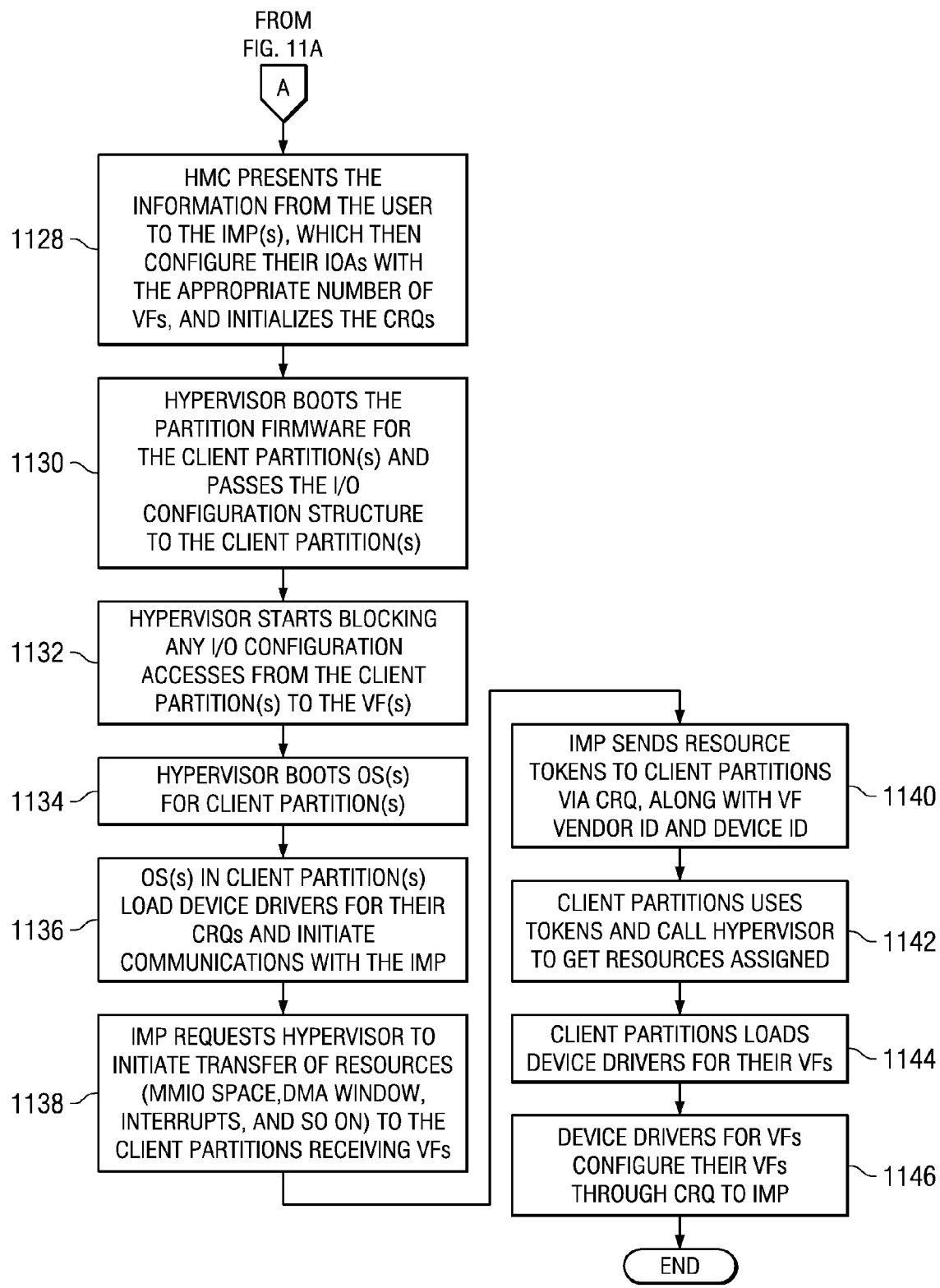

FIGS. 11A-11B illustrate a flowchart outlining an exemplary "bring-up" operation for a system with I/O Virtualized (IOV) adapters in accordance with one illustrative embodiment. As shown in FIG. 11A, the initial I/O fabric bring-up operation 1100 starts with an I/O fabric power on being performed (step 1102). In response to the power-on of the I/O fabric, the hypervisor 625 may discover, such as by probing a configuration space of the I/O fabric 611, all the I/O adapters 614-616 coupled to the I/O fabric 611 (step 1104), and which of the discovered adapters are IOV adapters 614, such as by detection of the IOV configuration space (step 1106).

The hypervisor 625 may then report all the information it has collected from probing the I/O configuration space to the HMC 609 (step 1108), such as for presentation to a user. The user may then assign resources to the LPARs or to the available pool of free resources. The information reported may include, for example, information that the user needs in order to make the decision on what is in the I/O fabric and endpoints, including items such as the Vendor ID, and Device ID.

It is now up to the user at the HMC 609 to determine how they want to allocate all the system resources. Note that this could also be done by automated scripts running in the HMC 609, rather than a human being, or any other automated mechanism for assigning or allocating system resources to logical partitions of the system 601. The HMC 609 hence, in the exemplary embodiment, presents the I/O fabric and endpoint information collected to the user (step 1110) and the user specifies how the resources are to be allocated (1112). This allocation not only includes I/O, but will also include other system resources such as processors and memory. Once the user has made the assignments of resources, this is reported to the hypervisor 625 (step 1114).

The hypervisor 625 may then set up each partition's resources including MMIO addressing, DMA addressing, interrupts, and other resources (step 1116). The hypervisor 625 does not necessarily know in advance, for example by thoroughly probing the adapters to be assigned to the partitions, how much resources that the adapters will need, and therefore may just allocate for each adapter enough resources that will cover all the adapters that may be of interest to the particular system, a "clump" of resources so to speak. The determination made above that an adapter is an IOV adapter or not may determine how much of the resources are assigned to the adapter, with IOV adapters generally needing more resources than non-IOV ones. Given the resources available, each LPAR has to try to deal with those resources given the adapters that they are assigned, and the IMP 603 is no exception based on the amount of resources assigned for the IOV adapters 614 that it gets assigned. The result of the hypervisor 625 not assigning enough resources to an LPAR for the assigned adapters, may result in the LPAR not being able to use some of the adapters that are assigned.

The hypervisor 625 boots the partition firmware for the IMP(s) 603 and passes to the IMP(s) 603 information about which IOV IOA(s) are assigned to each and then boots the OS for each IMP 603 (step 1118). The IMP OS discovers the IOV IOAs, the number of PFs and VFs supportable by each, the resources needed for all the VFs, and any system resource limitations, for example the MMIO address space available, DMA address space available, or the number of interrupts available (step 1120).

For all adapters, the IMPs 603 report to the HMC the information needed by the HMC or the user at the HMC to determine how to configure the IOV adapter, for example the Vendor ID, Device ID, number of PFs supportable, and the number of VFs supportable (step 1122). This information is reported to the HMC, for example, by the query I/O fabric configuration (IMP) request 1004. The information on the number that can be supportable may be limited by the resources available to that adapter, like address space limitations or number of interrupts available.

The HMC presents this information to the user who is configuring the system and the user determines how many VFs that are to be used, and which ones get assigned to which client partitions (step 1124). The HMC presents the IOV information from the user to the hypervisor which then creates the CRQ data structures necessary for linkages from the IMP(s) to the client partition(s) (step 1126). This presenting is done, for example, by the set LPAR I/O configuration request 1006.

The process continues in FIG. 11B where HMC presents the information from the user to the IMP(s) which then configure their IOV adapters with the appropriate number of VFs, and initialize the CRQs to be used to communicate with the client partitions that are to receive the VFs (step 1128). This presenting is done, for example, by the set initial VF to client partition assignments request 1008.

The hypervisor 625 may then boot the partition firmware 624 for the client partition(s) 604 and may pass the I/O configuration structure to the client partition(s) 604 for use by the OSs in those LPARs (step 1130). The hypervisor 625, on assignment of the VF(s) 613 to the client partition(s) 604, may block any I/O configuration access from the client partition(s) 604 to their VF(s) 613 (step 1132).

The OS for the client partition(s) 604 may then be loaded (step 1134). The client partition(s) 604 may load the device drivers 606 for their CRQ(s) 608 and initiates communications with the IMP associated with the CRQ (step 1136). After a client partition 604 has initiated communications via the CRQ to the IMP 604, the IMP requests the hypervisor initiate transfer of resources to the client partition, for example MMIO address space, DMA address space, which is also called the DMA window, and interrupts, to the client partition receiving the VF (step 1138). This is done, for example, by the grant logical resource call 924. This call returns a token from the hypervisor 625 to the IMP 603 which represents the resources to be transferred. These resources have not been actually transferred to the client partition 604 at this time.

The IMP 603 sends the resource token obtained in the last step to the client partition 604 via the associated CRQ(s) along with the Vendor ID and Device ID of the VF (step 1140). The client partition uses the token passed via the CRQ from the IMP and calls the hypervisor 625 to get the associated resources being passed assigned to them (step 1142). This is accomplished, for example, by using the accept logical resources call 926 and passing the token obtained in the last step. This token, which represents the resources, provides the hypervisor the information necessary to map the corresponding resources necessary to use the VF being assigned.

The client partition 604, using the Vendor ID and Device ID passed to it via the CRQ, loads a device driver 606 for the VF (step 1144) and configures its VF 613 by requesting configuration accesses through the CRQ mechanism (step 1146) via configuration read CRQ requests 814 and configuration write CRQ requests 816, for example. The device driver 606 may then begin to use its VF 613. The operation then terminates.

Figure 12B:
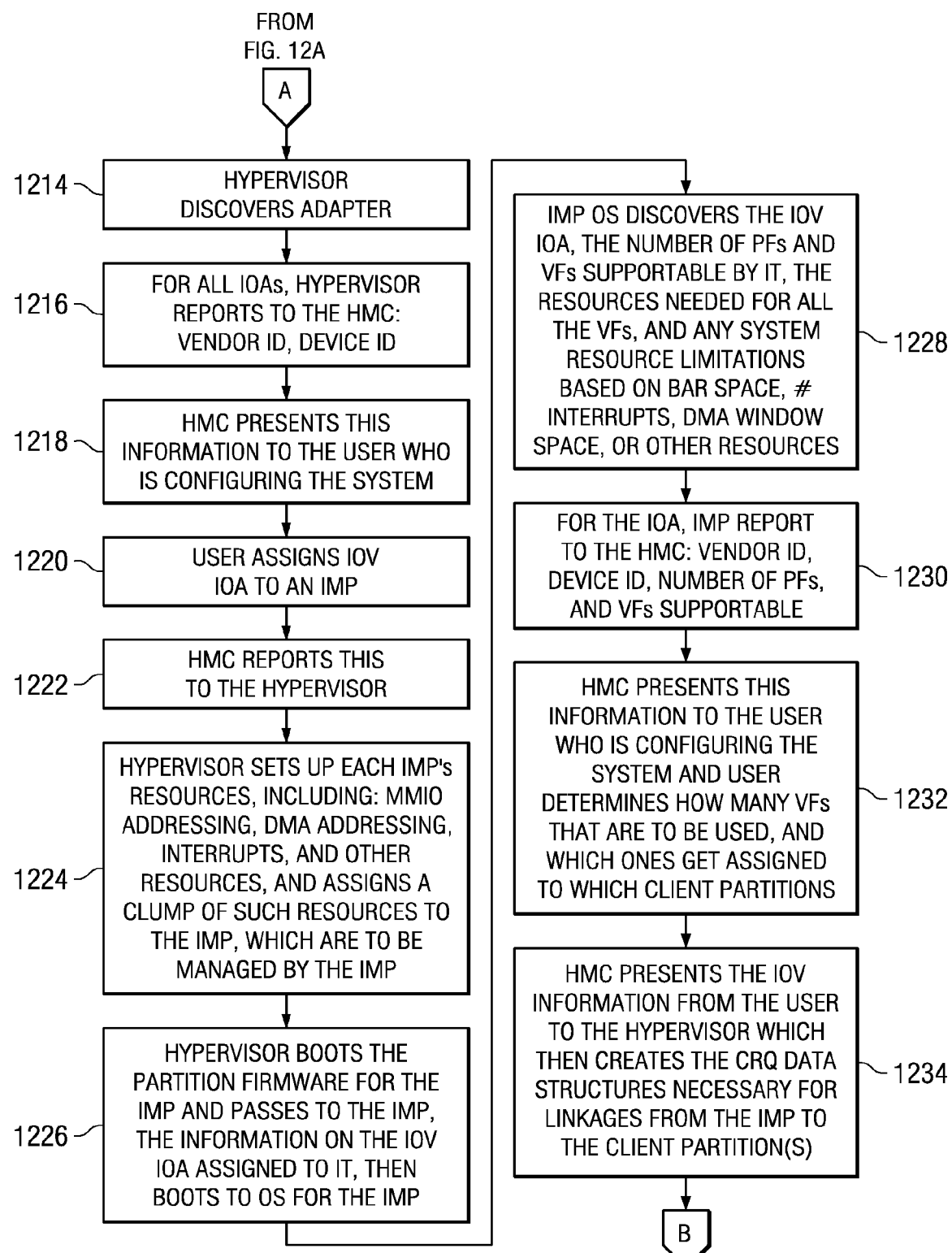

Once the system is up and operational, it is desirable to be able to add new I/O adapters or endpoints dynamically to the system. FIGS. 12A-12C illustrate a flowchart outlining an exemplary hot-plug operation for adding an IOV adapter to a system in accordance with one illustrative embodiment. As shown in FIGS. 12A-12C, the hot-plug addition operation 1200 starts with the user, at the HMC console 609, starting a hot-plug application (step 1204) which provides a user interface to direct the user through the hot-plug operation. From the hot-plug application, the user or the application may select an empty I/O slot in the I/O fabric 611 into which to plug the new I/O adapter or endpoint, e.g., I/O endpoint 614 (step 1206). The user may then plug-in the new I/O adapter (IOA) or endpoint (step 1208) and the HMC 609 may reports that the IOA has been plugged-in (step 1210). Those skilled in the art recognize that hot-plug applications for I/O buses, such as PCIe, can be invoked automatically by inserting a new IOA into an unused slot and having the system automatically invoke the hot-plug application. The HMC 609 may then send a message to the hypervisor 625 to power up the IOA and may get its configuration information (step 1212), and the operation continues to step 1214 in FIG. 12B.

In a similar manner that the hypervisor 625 gathered information in the initial fabric bring-up operation 1100, the hypervisor 625 may discover the IOA (step 1214) and may report the IOA configuration information to the HMC 609 (step 1216).

The HMC 609 may present the configuration information to the user (step 1218). The user may specify which IMP to which to assign the added IOV adapter (step 1220) and the HMC 609 may report this resource allocation to the hypervisor 625 (step 1222) and the hypervisor 625 may create a partition for a new IMP 603, and may set up the IMP's resources, for example, MMIO addressing, DMA addressing, and interrupts (step 1224).

As in the initial case described above, the hypervisor 625 does not necessarily know in advance, for example by thoroughly probing the IOV adapter to be assigned to the IMP 603, how much of the resources that the IOV adapter will need. Therefore, the hypervisor 625 may just allocate for each IOV adapter enough resources that will cover all the IOV adapters that may be of interest to the particular system, i.e. a portion or a "clump" of resources. Given the resources available, the IMP 603 has to try to deal with those resources given the adapters that they are assigned. The result of the hypervisor 625 not assigning enough resources to an IMP 603 for the assigned adapter, may result in the LPAR not being able to use the adapter that is assigned.

The hypervisor 625 boots the partition firmware for the IMP 603 and passes to the IMP 603 information about which IOV IOA is assigned to it and then boots the OS for each IMP 603 (step 1226). The IMP OS discovers the IOV IOAs, the number of PFs and VFs supportable by each, the resources needed for all the VFs, and any system resource limitations, for example the MMIO address space available, DMA address space available, or the number of interrupts available (step 1228).

For the new IOV adapter, the IMP 603 reports to the HMC 609 the information needed by the HMC 609 or the user at the HMC 609 to determine how to configure the IOV adapter, for example the Vendor ID, Device ID, number of PFs supportable, and the number of VFs supportable (step 1230). This information is reported to the HMC 609, for example, by the query I/O fabric configuration (IMP) request 1004. The information on the number that can be supportable may be limited by the resources available to that adapter, like address space limitations or number of interrupts available.

The HMC 609 presents this information to the user who is configuring the system and the user determines how many VFs that are to be used, and which ones get assigned to which client partitions (step 1232). The HMC 609 presents the IOV information from the user to the hypervisor 625 which then creates the CRQ data structures necessary for linkages from the IMP 603 to the client partition(s) (step 1234). This presenting is done, for example, by the set LPAR I/O configuration request 1006.

The process continues in FIG. 12C where HMC presents the information from the user to the IMP 603 which then configures the IOV adapter with the appropriate number of VFs, and initialize the CRQs to be used to communicate with the client partitions that are to receive the VFs (step 1236). This presenting is done, for example, by the set initial VF to client partition assignments request 1008.

The HMC 609 may now issue a dynamic add of VF request 1016 to the client partition(s) 604 which are to receive a VF 613 from the new IOA 614. This starts the client partition 604 processes to add the VF(s) (step 1238). The client partition(s) 604 may load the device drivers 606 for their CRQ(s) 608 and initiate communications with the IMP 603 associated with the CRQ(s) 608 (step 1240). After a client partition 604 has initiated communications via the CRQ to the IMP 603, the IMP 603 requests that the hypervisor 625 initiate transfer of resources to the client partition 604, for example MMIO address space, DMA address space, which is also called the DMA window, and interrupts, to the client partition receiving the VF (step 1242). This is done, for example, by the grant logical resource call 924. This call returns a token from the hypervisor 625 to the IMP 603 which represents the resources to be transferred. These resources have not been actually transferred to the client partition 604 at this time.

The IMP 603 sends the resource token obtained in the last step to the client partition 604 via the associated CRQ(s) along with the Vendor ID and Device ID of the VF (step 1244). The client partition 604 uses the token passed via the CRQ from the IMP 603 and calls the hypervisor 625 to get the associated resources being passed assigned to them (step 1246). This is accomplished, for example, by using the accept logical resources call 926 and passing the token obtained in the last step. This token, which represents the resources, provides the hypervisor the information necessary to map the corresponding resources necessary to use the VF being assigned.

The client partition 604, using the Vendor ID and Device ID passed to it via the CRQ, loads a device driver 606 for the VF (step 1248). The device driver(s) 606 for the VF(s) 613 may configure their VF(s) 613 through their own CRQ 608 to the IMP 603 (step 1250) via configuration read CRQ requests 814 and configuration write CRQ requests 816 in FIG. 8, for example, and may begin using their newly configured VF(s) 613. The operation then terminates.

Figure 13:
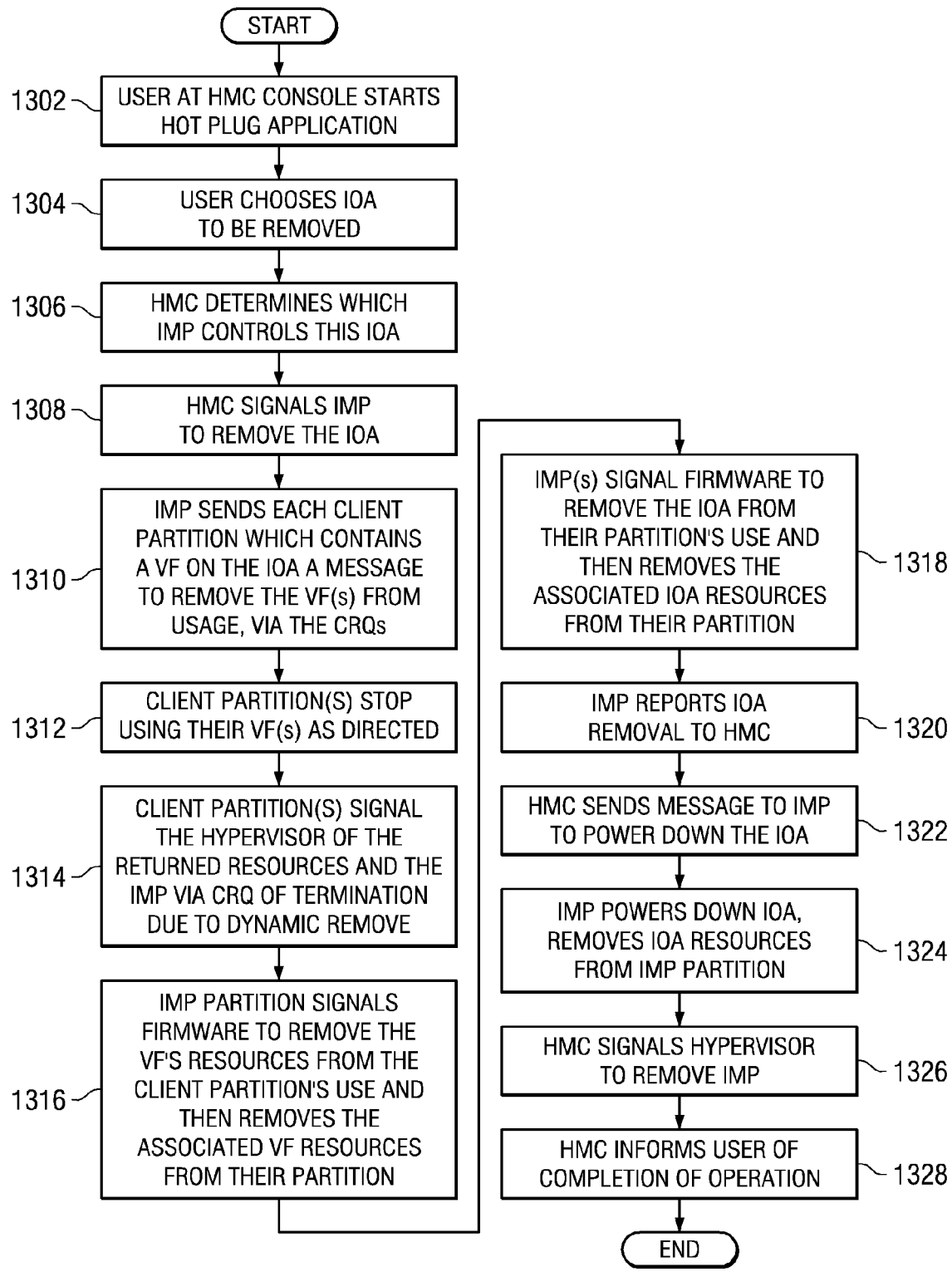
FIG. 13 is a flowchart outlining an exemplary hot-plug operation for removing an IOV adapter from a system in accordance with one illustrative embodiment.

In addition to dynamically adding I/O adapters or endpoints to the I/O fabric 611 of the system 601 of the illustrative embodiments, it is beneficial to be able to allow I/O adapters or endpoints to be dynamically removed from the I/O fabric 611. FIG. 13 is a flowchart outlining an exemplary hot-plug operation for removing an IOV adapter from a system in accordance with one illustrative embodiment. As shown in FIG. 13, the hot-plug removal operation 1300 starts with the user at the HMC console 609 starting the hot-plug application (step 1302). The user may choose that an I/O adapter (IOA) or endpoint, such as I/O endpoint 614, be removed (step 1304).

The HMC 609 determines which partitions, if any, contain PF 612 and VF 613 resources from the IOA to be removed (step 1306). The HMC 609 may signal the IMP 603 to remove the IOV adapter (step 1308) by use of the dynamic remove of an IOV adapter (IMP) request 1020, for example. The IMP 603 may then send each client partition 604 which contains a VF 613 on the IOA, a request to remove the VF from usage (step 1310) via a return resource CRQ IMP request 856, for example. The client partition(s) 604 may stop using their VF(s) 613 (step 1312), signal the hypervisor 625 of the returned resources by the return logical resource call 928, for example, and may signal the IMP 603 via a VF operations terminated due to a dynamic remove CRQ request 826, for example, of the termination (step 1314).

The IMP partition 603 may signal partition firmware 623 to remove the VF(s) 613 from use by the client partition(s) 604 (step 1316) via the rescind logical resource (normal) call 930, for example. The VF removal being complete, the IMP 603 may now complete the process of removing the I/O adapter from the IMP 603. The IMP 603 may then remove the associated I/O adapter 612 resources from their partition (step 1318) by use of the remove adapter from LPAR use 922, for example.

The IMP 603 may then report the I/O adapter removal to the HMC 609 (step 1320). The IOA 614 is now no longer in use, and the HMC 609 may send a message to the IMP 603 to turn off power to the IOA 614 (step 1322) via the power up/down IOA request 1010, for example. The IMP 603 may then power down the IOA 614, may remove the IOA 614 resources from the IMP 603, and may report completion to the HMC 609 (step 1324). The HMC now signals the hypervisor 625 to remove the assignment of the IOA to the IMP 603 (step 1326) by use of the dynamic remove of an IOV adapter (hypervisor) 1018, for example, and then the HMC 609 may report the completion to the user (step 1328), whereas the user can then unplug the IOA 614, if desired, and the operation is complete.

Figure 14:
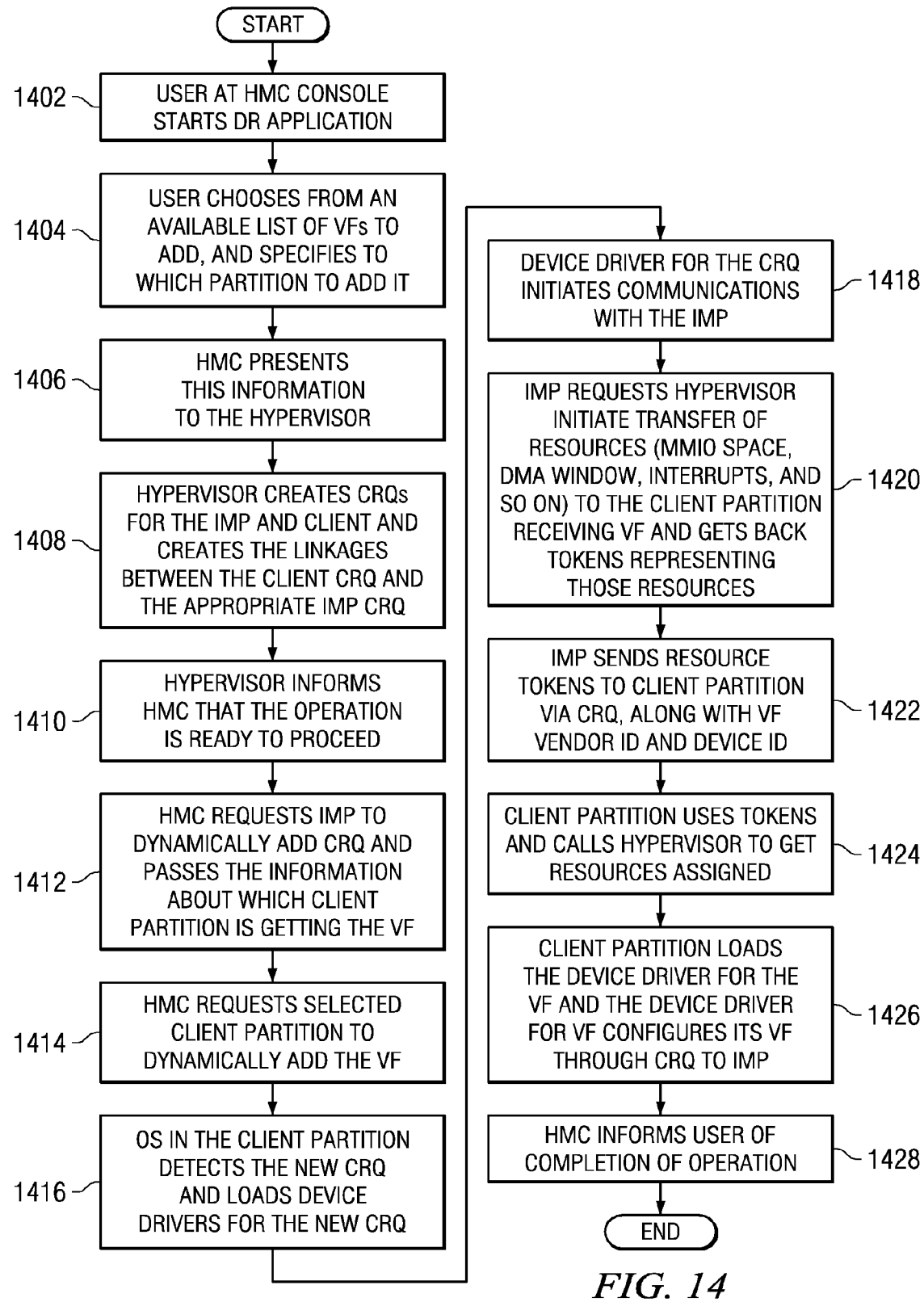
FIG. 14 is a flowchart outlining an exemplary operation for dynamically adding a virtual function (VF) to a logical partition (LPAR) in accordance with one illustrative embodiment.

One of the useful features of I/O virtualization and the implementation of VFs is the capability to have enough resources in the system to dynamically shift those resources around when necessary for load balancing. This can be done by having a pool of available resources from which VFs can be selected for adding to an LPAR, or by removing a VF from an LAPR that is not necessarily making good use of the VF's resources and adding the VF to a LPAR that can make better use of the VF's resources. FIG. 14 is a flowchart outlining an exemplary operation for dynamically adding a virtual function (VF) to a logical partition (LPAR) in accordance with one illustrative embodiment. The operation outlined in FIG. 14 may be used to shift the VF's resources from one LPAR to another when needed to optimize the operation of the system 601, for example.

As shown in FIG. 14, the VF addition operation 1400 starts with the user at the HMC 609 starting a Dynamic Reconfiguration (DR) application (step 1402). The user may choose from an available list of VFs 613 to add, and may specify to which client partition to add the VF 613 (step 1404). The HMC 609 may present this information to the hypervisor 625 (step 1406) via the set LPAR I/O configuration request 1006, for example. The hypervisor 625 may also create CRQs 607 and 608 for the IMP 603 and client partition 604 and the linkages between the client CRQ 608 and appropriate IMP CRQ 607 (step 1408).

The hypervisor 625 may inform the HMC 609 that the operation is ready to proceed (step 1410) by signaling completion of the requested operation. The HMC 609 may next request that the IMP 603 dynamically add the CRQ 607 and passes the information about which client partition is getting the VF (step 1412) via the dynamic add of VF request 1016, for example. The HMC 609 may next request the client partition 604 to dynamically add the VF 613 (step 1414) via the dynamic add of VF request 1016. The client partition 604 may detect the new CRQ 608 and may load the device driver 606 for the new CRQ 608 (step 1416).

After a client partition 604 has initiated communications via the CRQ to the IMP 603 (step 1418), the IMP 603 requests the hypervisor 625 initiate transfer of resources to the client partition 604, for example MMIO address space, DMA address space, which is also called the DMA window, and interrupts, to the client partition 604 receiving the VF (step 1420). This is done, for example, by the grant logical resource call 924. This call returns a token from the hypervisor 625 to the IMP 603 which represents the resources to be transferred. These resources have not been actually transferred to the client partition 604 at this time.

The IMP 603 sends the resource token obtained in the last step to the client partition 604 via the associated CRQ(s) along with the Vendor ID and Device ID of the VF (step 1422). The client partition uses the token passed via the CRQ from the IMP 603 and calls the hypervisor 625 to get the associated resources being assigned to them (step 1424). This is accomplished, for example, by using the accept logical resources call 926 and passing the token obtained in the last step. This token, which represents the resources, provides the hypervisor 625 the information necessary to map the corresponding resources necessary to use the VF being assigned.

The device driver 606 for the VF 613 may now be loaded and configure its VF 613 through the CRQ 608 to the IMP 603 (step 1426) via configuration read CRQ requests 814 and configuration write CRQ requests 816, for example. Finally, the HMC 609 may inform the user of the completion of the operation 824 and the operation is complete (step 1428).

Figure 15:
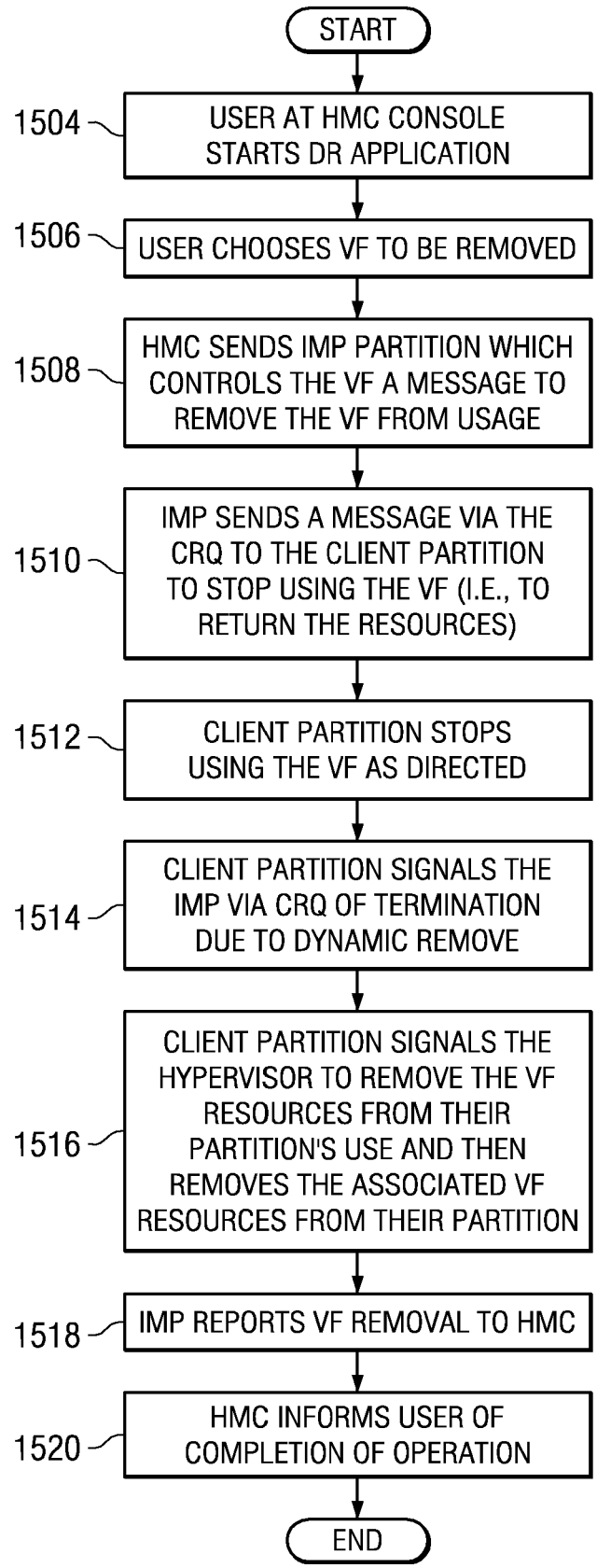
FIG. 15 is a flowchart outlining an exemplary operation for dynamically removing a VF from a LPAR in accordance with one illustrative embodiment.

FIG. 15 is a flowchart outlining an exemplary operation for dynamically removing a VF from a LPAR in accordance with one illustrative embodiment. The dynamic VF remove operation 1500 in FIG. 15 is the other piece of the capability to move around I/O resources between the various LPARs of the system 601. That is, a VF may be removed from its association with one LPAR using the operation shown in FIG. 15 and then added to another LPAR using the VF add operation outlined in FIG. 14 above.

As shown in FIG. 15, the VF removal operation 1500 starts with the user starting the DR application at the HMC 609 (step 1504). The user may choose a VF, such as VF 613, to be removed (step 1506) and the HMC 609 may send a dynamic remove VF request 1016, for example, to the IMP 603 which owns the VF to start the VF removal process (step 1508). The IMP 603 signals the client partition 604 to stop using the VF and return the VF resources (step 1510), for example, by use of the return resource CRQ IMP request 856. The client partition 604 may receive this request and stop using the VF 613 as directed (step 1512).

The client partition 604 may signal the IMP 603 via the CRQ 608 of the termination due to a dynamic remove (step 1514) via the VF operations terminated due to a dynamic remove CRQ message 826, for example, which causes the dynamic removal operation of the CRQ 607 at the IMP 603. The client partition 604 may signal the hypervisor 625 to remove the resources for the VF 613 from the partition's use via the return logical resources call 928, for example. The hypervisor 625 as well as the OS 632 may then remove the associated VF 613 resources from the client partition 604 (step 1516). The IMP 603 may report the VF removal to the HMC 609 (step 1518). The HMC 609 may inform the user of the completion of the operation (step 1520) and the operation terminates.

In addition to dynamically adding and removing I/O adapters or endpoints, and being able to shift VFs and their associated resources among LPARs, in a virtualized system it is useful for robustness of error handling to be able to recover from errors. The illustrative embodiments provide a mechanism for being able to recover from errors by retrieving error information, logging the error information, resetting and configuring the VFs, and then attempting to restart outstanding I/O operations. This operation is outlined in FIG. 16 as described hereafter.

Figure 16:
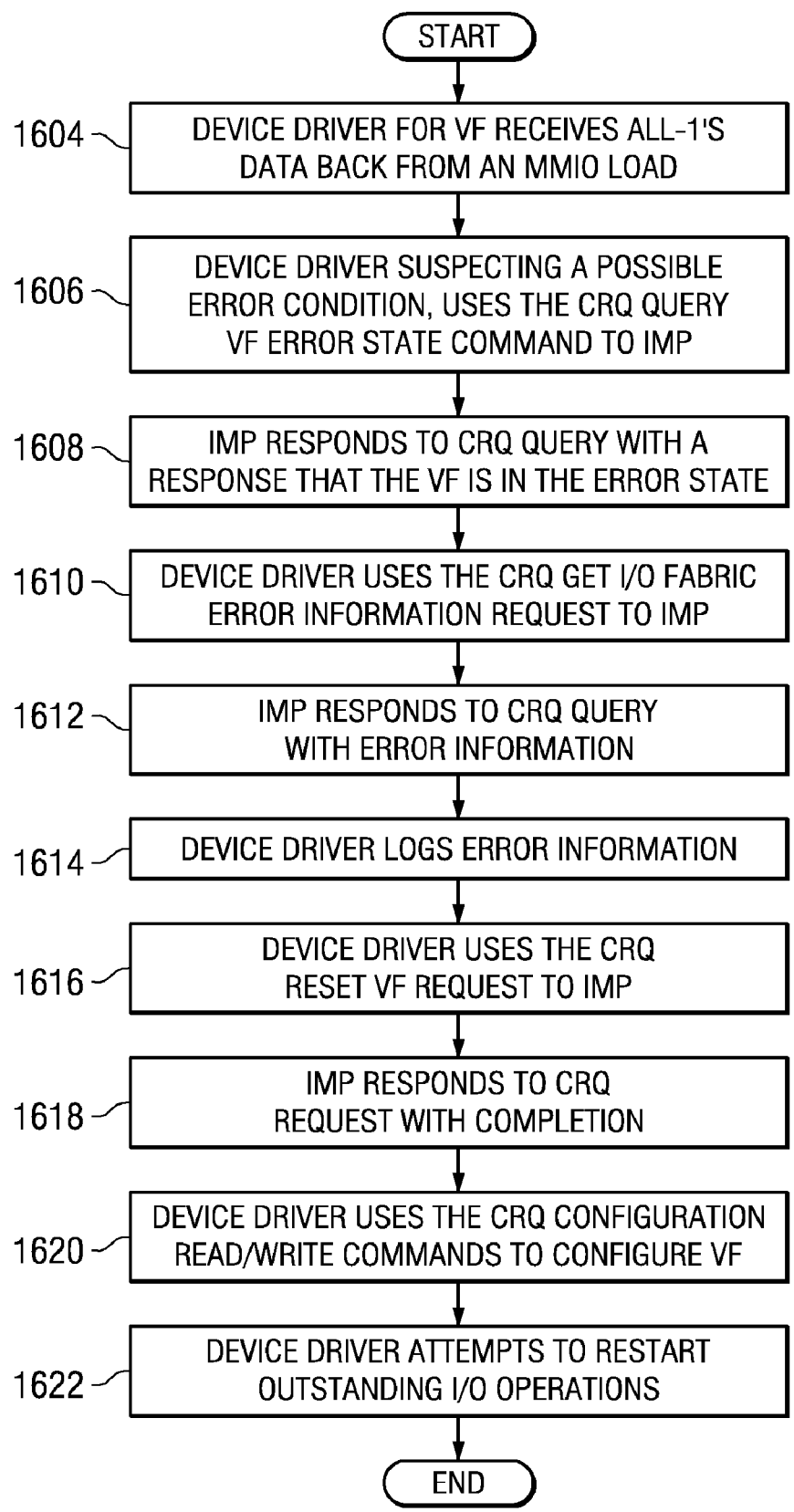
FIG. 16 is a flowchart outlining an exemplary operation for error recovery from an error incurred by a VF in accordance with one illustrative embodiment.

FIG. 16 is a flowchart outlining an exemplary operation for error recovery from an error incurred by a VF in accordance with one illustrative embodiment. The operation outlined in FIG. 16 uses an existing technique of stopping all DMA and MMIO to a VF until the device driver can recognize that there was an error, and can gracefully recover. However, the operation of FIG. 16 utilizes the mechanisms of the illustrative embodiments to augment this existing technique to utilize the CRQ mechanism to control the error recovery process for VFs.

As shown in FIG. 16, the VF error recovery operation 1600 starts after an error has occurred which has put the VF into a MMIO Stopped State and DMA Stopped State. In this state, no DMA operations from the VF will be completed, MMIO Store operations will be discarded while in the MMIO Stopped State, and MMIO Load operations will get all-1's data returned. The process of error recovery starts with the device driver, e.g., device driver 606, receiving all-1's data back from an MMIO Load operation (step 1604). The device driver 606, not expecting (or not sure if it should expect) all-1's data back, may use the CRQ query error state for VF CRQ request 820, for example, for the VF 613 to get the VF state information (step 1606). Since the VF 613 is in the error state at this point, the IMP 603 may respond to the query that the VF 613 is in the MMIO Stopped and DMA Stopped error state (step 1608). The device driver 606 may use the get I/O fabric error information CRQ request 824, for example, to obtain information about the error registers in the I/O fabric 611, for later problem determination (step 1610). The IMP 603 may respond to the query with the error information (step 1612) and the device driver 606 may log the information into an error log for later analysis (step 1614).

The device driver 606 may now be ready to reset its VF and try to restart operations. The device driver 606 may use the reset VF CRQ request 818, for example, to reset the VF 613 (step 1616) and the IMP 603 may respond to the request with a completion response (step 1618). The device driver 606 may then use the CRQ mechanism, and specifically configuration read CRQ requests 814 and configuration write CRQ requests 816, for example, to configure its VF 613 (step 1620). The device driver 606 attempts to restart outstanding I/O operations (step 1622) and the operation terminates.

Figure 17:
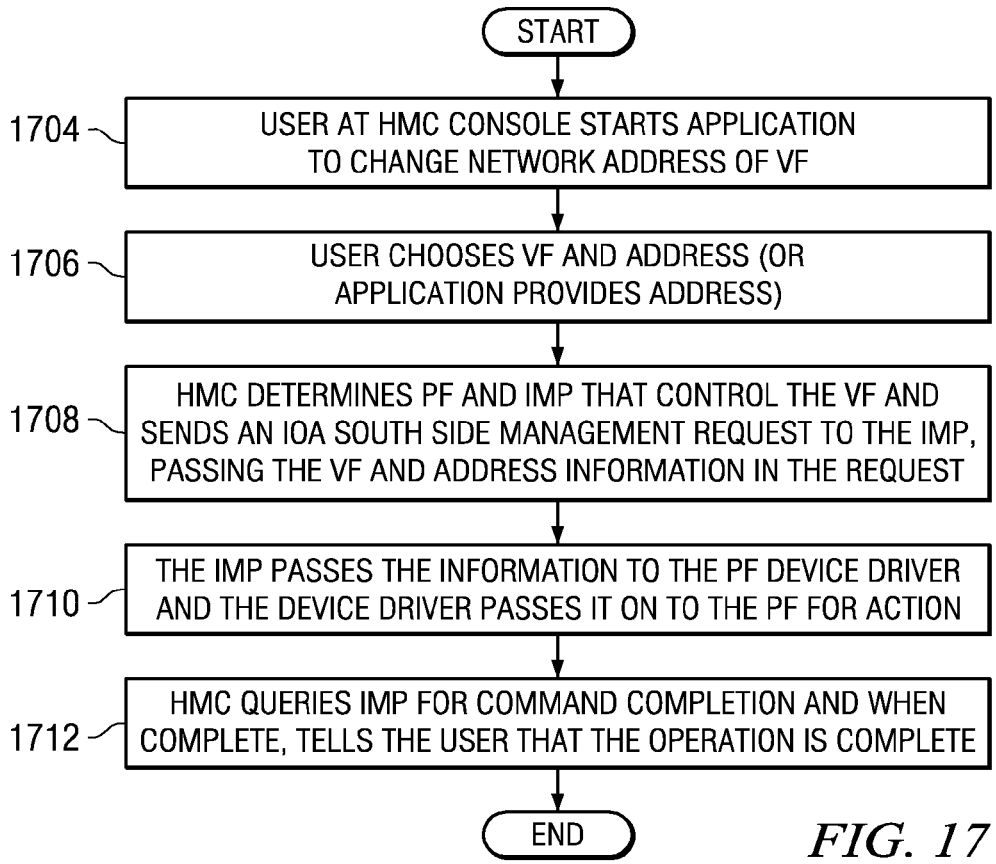
FIG. 17 is a flowchart outlining an exemplary IOA southside management operation for changing a network address on a network adapter in accordance with one illustrative embodiment.

As previously mentioned, an important function of the IMP 603 is to provide secure access to resources of the IOA or endpoint that are either shared across the multiple LPARs that are using the VFs associated with a PF, or are unique to a VF, but which should not be accessible for change by the PF. One example of such a resource of a network I/O adapter (IOA) or endpoint is the network address associated with a PF which is shared by the VFs, or a network address that is unique to a VF. Management of these device-specific resources is referred to as IOA "south side" management of the I/O adapter or endpoint. FIG. 17 is a flowchart outlining an exemplary IOA south-side management operation for changing a network address on a network adapter in accordance with one illustrative embodiment. It should be appreciated that while FIG. 17 is specifically directed to changing a network address on a network adapter, a similar operation may be performed for other resources shared across multiple LPARs that are using the VFs associated with a PF or are unique to a VF.

As shown in FIG. 17, the operation starts with the user at the HMC console 609 starting an application to change the network address for a VF 613 (step 1704). The user may choose the VF 613 and address (or the application may provide the address based on the context of the operation) (step 1706). The HMC 609 may determine the PF 612 and IMP 603 that controls the VF 613 and may send an IOA south side management request 1022 to the IMP 603, passing the VF 613 and address information in the IOA south side management request 1022 (step 1708). The IMP 603 may pass the information to the PF device driver 605 and the PF device driver 605 may pass it on to the PF 612 for processing (step 1710). The HMC 609 may query the IMP 603 for command completion and when complete, may inform the user that the operation is complete (step 1712) and the operation terminates.

Figure 18:
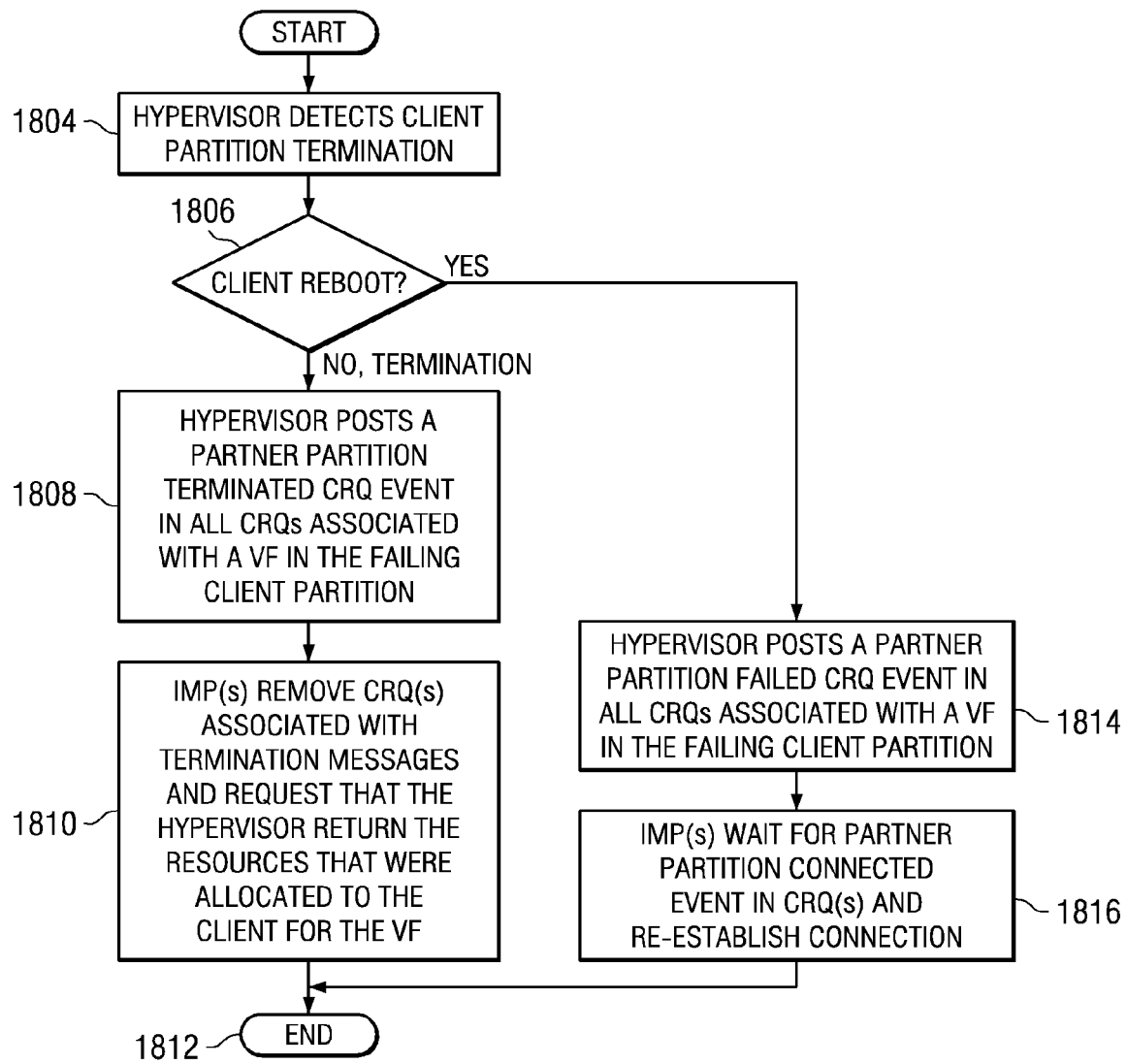
FIG. 18 is a flowchart outlining an exemplary operation for client partition termination in accordance with one illustrative embodiment.

It should be appreciated that the client partitions 604 in the system 601 may terminate operation while the system 601 is operational. There may be many different reasons why a client partition 604 may terminate, such as a non-recoverable error in the software in the client partition or a non-recoverable hardware error that affects only the partition to which that hardware is assigned. FIG. 18 is a flowchart outlining an exemplary operation for client partition termination in accordance with one illustrative embodiment. The operation 1800 outlined in FIG. 18 is directed to a case where the client partition terminates and either reboots or permanently terminates.

As shown in FIG. 18, the operation starts when a client partition 604 terminates for some reason (step 1802). The hypervisor 625, which can detect when a client partition terminates, for example from a panic call from the partition to the hypervisor due to a non-recoverable software error, or due to a machine check interrupt from the hardware on a non-recoverable hardware error, may detect that the client partition 604 has terminated (step 1804). The hypervisor 625 may then determine if the client partition 604 is set for reboot or not (step 1806), for example as determined from the user's reboot policy set as part of initially setting up the partition.

If the client partition 604 is not set for reboot, the hypervisor 625 may post a partner partition terminated CRQ event 806, for example, in all CRQs 607 and 608 associated with a VF 613 in the failing client partition 604 (step 1808). The fact that it is a termination means that the failing client partition 604 is not going to be rebooted anytime soon and thus, the IMP(s) 603 remove the CRQs 607 associated with the termination messages and request that the hypervisors rescind usage of the previously allocated resources (step 1810) by use of the rescind logical resource (forced) 932 call, for example, and the operation terminates.

If the determination is made that the client partition 604 is to be rebooted (step 1806), then the hypervisor 625 may post a partner partition failed CRQ event 804, for example, in all CRQs 607 associated with PFs 612 associated with all VFs 613 in the failing client partition 604, which informs the IMP(s) 603 involved that the client partition 604 is being rebooted and may come back momentarily (step 1814). In this case, the IMP(s) 603 wait for the partner partition connected CRQ event 802, for example, and may re-establish communications with the client partition 604 at that point (step 1816). The operation then terminates.

Figure 19:
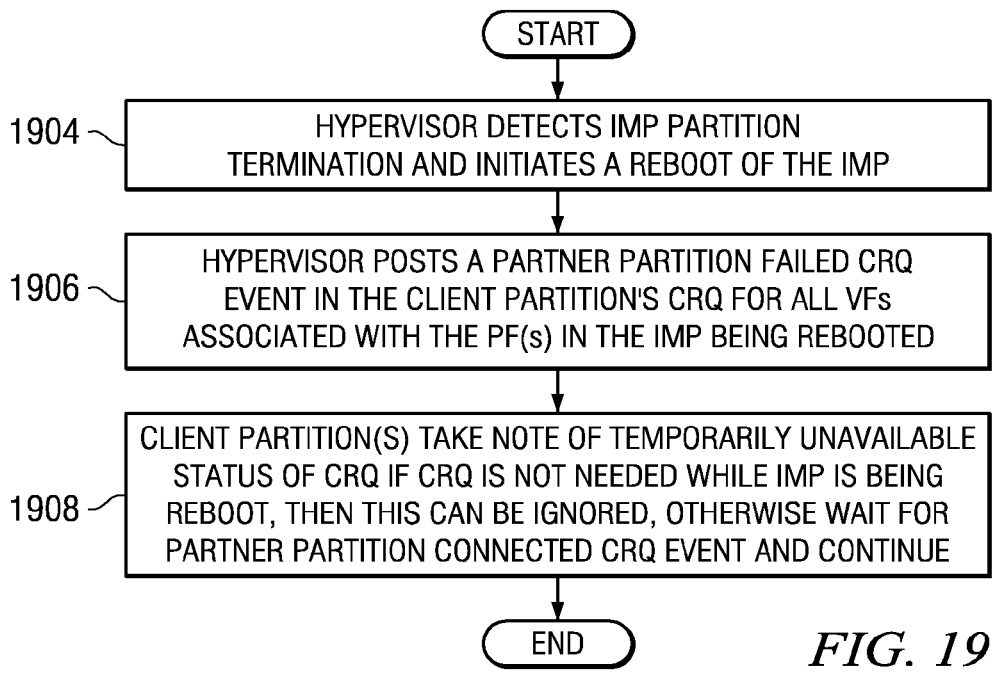
FIG. 19 is a flowchart outlining an exemplary operation for IMP partition termination in accordance with one illustrative embodiment.

It should be appreciated that during operation of the system 601, it is also possible that the IMP 603 may fail. It is expected that the IMP 603 will always be set to reboot if it fails because it is acting as a server for potentially many VFs 813 in many client partitions 604. FIG. 19 is a flowchart outlining an exemplary operation 1900 for IMP partition termination in accordance with one illustrative embodiment. As shown in FIG. 19, the operation 1900 starts with the IMP partition terminating (step 1902). The hypervisor 625 may detect the IMP 604 partition termination, for example from a panic call from the partition to the hypervisor due to a non-recoverable software error, or due to a machine check interrupt from the hardware on a non-recoverable hardware error, and initiates a reboot of the IMP 604 (step 1904).

The hypervisor 625 may post a partner partition failed CRQ event 804, for example, in the client partition's CRQ 608 for all VFs 613 associated with the PF(s) 612 in the IMP 603 being rebooted (step 1906). The client partitions 604 may take note of the temporarily unavailable status of the CRQ 608 but if the CRQ 608 is not needed while the IMP 603 is being rebooted, they may ignore the partner partition failed CRQ event message 804. Otherwise, the client partition 604 waits for the re-establishment of the CRQ connection as indicated by the receipt of the partner partition connected CRQ event 802, for example, in the CRQ 608 associated with the VF 613 in order to continue the operation with the CRQ 608 (step 1908). The operation then terminates.

Thus, the illustrative embodiments provide mechanisms that allow the management software for the configuration, error management, and south-side adapter specific management to be performed in a separate management partition, rather than in the hypervisor. It is desirable to keep I/O dependent code out of the hypervisor to prevent performance impacts to the hypervisor. Moreover, it is desirable to put I/O dependent code in a separate management partition so as to minimize any instability of the hypervisor code due to frequent updates, for example, due to the necessity of updating the code for different adapter-unique south-side management and error recovery software. Thus, the mechanisms of the illustrative embodiments provide a much more efficient operation of the hypervisor while minimizing instability.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing input/output (I/O) virtualization, comprising:
   creating one or more client partitions in the data processing system, each client partition having an associated portion of resources of the data processing system;
   creating, in the data processing system, an I/O virtualization management partition (IMP);
   identifying, by the IMP, one or more I/O virtualization (IOV) enabled I/O endpoints associated with the data processing system;
   assigning, by the IMP, virtual functions of the one or more IOV enabled I/O endpoints to the one or more client partitions;
   creating, by a hypervisor of the data processing system, at least one communication structure for communicating between the IMP and the one or more client partitions based on the assignment of virtual functions to the one or more client partitions;

performing, by at least one client partition of the one or more client partitions, virtual function configuration operations with one or more virtual functions of the one or more IOV enabled I/O endpoints using the at least one communication structure;

determining a number of virtual functions to be implemented in the data processing system and to which client partitions of the one or more client partitions to assign each virtual function by:

determining a number of virtual functions supported by each identified IOV enabled I/O endpoint;

presenting information describing the identified IOV enabled I/O endpoints and the number of virtual functions supported by each identified IOV enabled I/O endpoint to a user; and receiving user input indicating a number of virtual functions to be implemented in the data processing system and to which client partitions of the one or more client partitions to assign each virtual function; and allocating resources to the one or more client partitions based on the determined number of virtual functions to be implemented and the determination of which client partitions to assign each virtual function.

2. The method of claim 1, wherein allocating resources further comprises:

assigning, by the hypervisor of the data processing system, a portion of resources of the data processing system to the IMP for management by the IMP;

determining, by the IMP, a number of resources necessary for the virtual functions assigned to the one or more client partitions; and performing one or more calls from the one or more client partitions, to which virtual functions are assigned, to the hypervisor to assign resources from the portion of resources to the one or more client partitions.

3. The method of claim 1, further comprising:

requesting, by the IMP, that the hypervisor initiate a transfer of resources to the one or more client partitions to which virtual functions are assigned;

receiving, in the IMP, from the hypervisor, in response to the request, one or more tokens; and sending, from the IMP, the tokens to the one or more client partitions via the communication structure, wherein the one or more client partitions use the one or more tokens to obtain resources from the hypervisor.

4. The method of claim 1, wherein the IMP is provided with access to only configuration spaces for physical functions assigned to the IMP and configuration spaces for virtual functions belonging to physical functions assigned to the IMP, in the one or more IOV enabled I/O endpoints.

5. The method of claim 1, wherein the one or more client partitions do not have direct access to configuration spaces of virtual functions assigned to the one or more client partitions, in the one or more IOV enabled I/O endpoints, and only access the configuration spaces of virtual functions assigned to the one or more client partitions via the IMP using the at least one communication structure.

6. The method of claim 5, wherein the IMP permits access by a client partition to configuration spaces of virtual functions, in the one or more IOV enabled I/O endpoints, assigned to the client partition and blocks access by the client partition to configuration spaces of virtual functions, in the one or more IOV enabled I/O endpoints, that are not assigned to the client partition.

7. The method of claim 1, further comprising receiving an input from a hardware management console (HMC) directing assignment of the virtual functions to the one or more client partitions and directing performance of the I/O virtualization management operations.

8. The method of claim 7, wherein the input from the HMC is a command to initiate a hot-plug operation for adding a new IOV enabled I/O endpoint to the data processing system, and wherein performing the I/O virtualization management operations comprises:

assigning the new IOV enabled I/O endpoint to the IMP;

configuring the IMP based on the addition of the new IOV enabled I/O endpoint;

dynamically adding at least one virtual function of the new IOV enabled I/O endpoint to at least one client partition in the one or more client partitions;

allocating resources to the at least one client partition in the one or more client partitions based on the dynamic adding of the at least one virtual function of the new IOV enabled I/O endpoint; and configuring the at least one virtual function of the new IOV enabled I/O endpoint via the IMP using the at least one communication structure.

9. The method of claim 7, wherein the input from the HMC is a command to initiate a hot-plug operation for removing an existing IOV enabled I/O endpoint from the data processing system, and wherein performing the I/O virtualization management operations comprises:

identifying at least one client partition in the one or more client partitions having resources associated with a virtual function of the IOV enabled I/O endpoint to be removed;

removing the virtual function and resources associated with the virtual function from use by the at least one client partition;

removing, from use by the IMP, a physical function and resources associated with the physical function; and powering down the IOV enabled I/O endpoint to be removed.

10. The method of claim 7, wherein the input from the HMC is a command to dynamically reconfigure the data processing system, and wherein performing the I/O virtualization management operations comprises:

receiving a selection of a virtual function of an IOV enabled I/O endpoint to add to a selected client partition in the one or more client partitions;

creating at least one communication structure for the selected virtual function in the IMP and the selected client partition;

sending a request, from the IMP to the hypervisor, requesting a transfer of resources to the selected client partition;

receiving, in the IMP, at least one token from the hypervisor in response to the request;

providing the at least one token to the selected client partition;

setting up resources for selected virtual function in the selected client partition;

using the at least one token, by the selected client partition, to obtain resources from the hypervisor; and loading a device driver for the selected virtual function in the selected client partition.

11. The method of claim 7, wherein the input from the HMC is a command to dynamically reconfigure the data processing system, and wherein performing the I/O virtualization management operations comprises:

receiving a selection of a virtual function of an I/O endpoint to remove from a selected client partition in the one or more client partitions;

removing the selected virtual function from further use by the selected client partition; and removing resources for selected virtual function in the selected client partition.

12. A computer program product comprising a computer readable storage medium having a computer readable program stored thereon, wherein the computer readable program, when executed in a data processing system, causes the data processing system to:

create one or more client partitions in the data processing system, each client partition having an associated portion of resources of the data processing system;

create, in the data processing system, an I/O virtualization management partition (IMP);

identify, by the IMP, one or more I/O virtualization (IOV) enabled I/O endpoints associated with the data processing system;

assign, by the IMP, virtual functions of the one or more IOV enabled I/O endpoints to the one or more client partitions;

create, by a hypervisor of the data processing system, at least one communication structure for communicating between the IMP and the one or more client partitions based on the assignment of virtual functions to the one or more client partitions; and perform, by at least one client partition of the one or more client partitions, virtual function configuration operations with one or more virtual functions of the one or more IOV enabled I/O endpoints using the at least one communication structure;

determine a number of virtual functions to be implemented in the data processing system and to which client partitions of the one or more client partitions to assign each virtual function by:

determining a number of virtual functions supported by each identified IOV enabled I/O endpoint;

presenting information describing the identified IOV enabled I/O endpoints and the number of virtual functions supported by each identified IOV enabled I/O endpoint to a user; and receiving user input indicating a number of virtual functions to be implemented in the data processing system and to which client partitions of the one or more client partitions to assign each virtual function; and allocate resources to the one or more client partitions based on the determined number of virtual functions to be implemented and the determination of which client partitions to assign each virtual function.

13. The computer program product of claim 12, wherein the computer readable program further causes the data processing system to:

assign, by the hypervisor of the data processing system, a portion of resources of the data processing system to the IMP for management by the IMP;

determine, by the IMP, a number of resources necessary for the virtual functions assigned to the one or more client partitions; and perform one or more calls from the one or more client partitions, to which virtual functions are assigned, to the hypervisor to assign resources from the portion of resources to the one or more client partitions.

14. The computer program product of claim 13, wherein the computer readable program further causes the data processing system to:

request, by the IMP, that the hypervisor initiate a transfer of resources to the one or more client partitions to which virtual functions are assigned;

receive, in the IMP, from the hypervisor, in response to the request, one or more tokens; and send, from the IMP, the tokens to the one or more client partitions via the communication structure, wherein the one or more client partitions use the one or more tokens to obtain resources from the hypervisor.

15. The computer program product of claim 12, wherein the IMP is provided with access to only configuration spaces for physical functions assigned to the IMP and configuration spaces for virtual functions belonging to physical functions assigned to the IMP, in the one or more IOV enabled I/O endpoints.

16. The computer program product of claim 12, wherein the one or more client partitions do not have direct access to configuration spaces of virtual functions assigned to the one or more client partitions, in the one or more IOV enabled I/O endpoints, and only access the configuration spaces of virtual functions assigned to the one or more client partitions via the IMP using the at least one communication structure.

17. The computer program product of claim 16, wherein the IMP permits access by a client partition to configuration spaces of virtual functions, in the one or more IOV enabled I/O endpoints, assigned to the client partition and blocks access by the client partition to configuration spaces of virtual functions, in the one or more IOV enabled I/O endpoints, that are not assigned to the client partition.

18. A data processing system, comprising:

one or more client partitions, each client partition having an associated portion of resources of the data processing system;

an I/O virtualization management partition (IMP) in communication with the one or more client partitions;

one or more I/O endpoints in communication with the IMP; and at least one communication structure, created by a hypervisor of the data processing system and provided in association with the IMP and the one or more client partitions for communicating between the IMP and the one or more client partitions based on the assignment of virtual functions to the one or more client partitions, wherein:

the IMP identifies one or more I/O virtualization (IOV) enabled I/O endpoints associated with the data processing system, the IMP assigns virtual functions of the one or more IOV enabled I/O endpoints to the one or more client partitions, at least one client partition of the one or more client partitions performs virtual function configuration operations with one or more virtual functions of the one or more IOV enabled I/O endpoints using the at least one communication structure, determines a number of virtual functions to be implemented in the data processing system and to which client partitions of the one or more client partitions to assign each virtual function by:

determining a number of virtual functions supported by each identified IOV enabled I/O endpoint;

presenting information describing the identified IOV enabled I/O endpoints and the number of virtual functions supported by each identified IOV enabled I/O endpoint to a user; and receiving user input indicating a number of virtual functions to be implemented in the data processing system and to which client partitions of the one or more client partitions to assign each virtual function; and allocates resources to the one or more client partitions based on the determined number of virtual functions to be implemented and the determination of which client partitions to assign each virtual function.

* * * * *